United States Patent [19]

Ueda

[11] Patent Number: 5,423,001
[45] Date of Patent: Jun. 6, 1995

[54] DATA TRANSMISSION AND APPARATUS, DATA PROCESSING APPARATUS AND A NEURAL NETWORK WHICH UTILIZE PHASE SHIFTED, MODULATED, CONVOLUTABLE PSEUDO NOISE

[75] Inventor: Tomoaki Ueda, Kyoto, Japan

[73] Assignee: Daikin Industries, Ltd., Osaka, Japan

[21] Appl. No.: 169,763

[22] Filed: Dec. 20, 1993

Related U.S. Application Data

[63] Continuation of Ser. No. 610,239, Nov. 7, 1990, abandoned.

[30] Foreign Application Priority Data

Nov. 7, 1989 [JP] Japan .................................. 1-289628

[51] Int. Cl.$^6$ .............................................. G06F 5/01
[52] U.S. Cl. ..................................... 395/200; 3/00; 364/259.5; 364/260.1; 364/260.9; 364/DIG. 1
[58] Field of Search .............................. 395/200, 800; 364/728.01, 728.03, 715.11, 728.07

[56] References Cited

U.S. PATENT DOCUMENTS

| | | | |
|---|---|---|---|
| 3,728,529 | 4/1973 | Kartehner | 235/152 |
| 4,715,045 | 3/1986 | Lewis | 375/58 |
| 4,772,853 | 9/1988 | Hart | 329/107 |
| 4,888,788 | 11/1989 | Teranishi | 375/1 |
| 5,020,075 | 5/1991 | Tachika | 375/1 |
| 5,029,180 | 7/1991 | Cowart | 375/1 |
| 5,184,135 | 2/1993 | Paradise | 342/149 |

FOREIGN PATENT DOCUMENTS

| | | |
|---|---|---|
| 216974 | 8/1987 | European Pat. Off. . |
| WO87/00370 | 1/1987 | WIPO . |

OTHER PUBLICATIONS

European Search Report and Annex.
T. O'Farrell et al., "Code-Division Multiple-Access (CDMA) Techniques in Optical Fibre LANs", Proceedings of the Second IEE National Conference on Telecommunications, 2nd-5th Apr. 1989, pp. 111-115.
J. Eldon, "Applications of the Digital Correlator", Microprocessor & Microsystems, vol. 12, No. 4, May 1988, pp. 214-223, Butterworth & Co.

*Primary Examiner*—Eric Coleman
*Attorney, Agent, or Firm*—Beveridge, DeGrandi, Weilacher & Young

[57] ABSTRACT

A data transmission method includes a step which modulates maximal-sequence codes which are phase shifted by different phase shift quantities based upon plural data for transmission, a step which then convolutes the modulated maximal-sequence codes to obtain transmission data, and afterwards, a step which receives the transmission data and obtains a cross-correlation of the transmission data with a maximal-sequence code which has been phase shifted by the same as the maximal-sequence code which corresponds to the data for transmission. A data transmission method also includes a step which modulates maximal-sequence codes which are phase shifted by different phase shift quantities based on plural data for transmission, then a step which convolutes the modulated maximal-sequence codes to obtain transmission data. The method previously obtains a time sequence code based on a weighting factor for all data and maximal-sequence codes which are phase shifted with corresponding phase shifting quantities, then obtains a cross-correlation of the transmission data and the time sequence code.

42 Claims, 20 Drawing Sheets

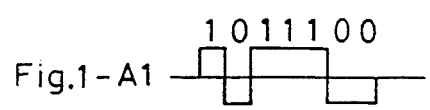
Fig.1-A1
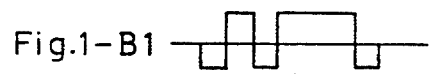
Fig.1-B1
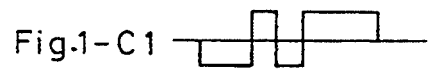
Fig.1-C1
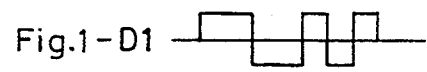
Fig.1-D1
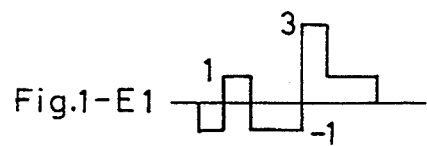
Fig.1-E1
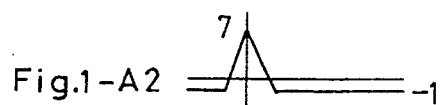
Fig.1-A2
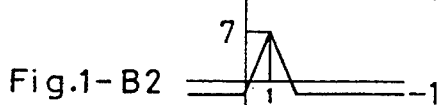
Fig.1-B2
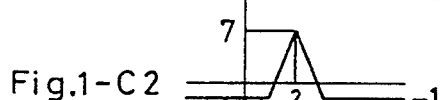
Fig.1-C2
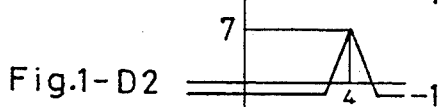
Fig.1-D2
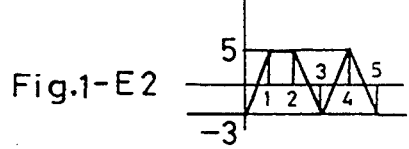
Fig.1-E2

MAXIMAL-SQUENCE CODE M1
MAXIMAL-SQUENCE CODE M2
MAXIMAL-SQUENCE CODE M3

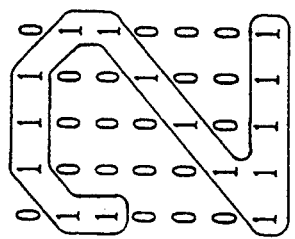
Fig.8 (A)
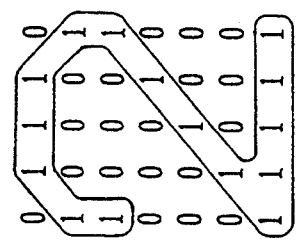
Fig.8 (D)
Fig.8 (B)
1111101010100110011101011010101101110010111001
0101100110001011110001010010000010000001
Fig.8 (C)
```
-15  113  113  113  -15
113  -15  -15  -15  113
113  -15  -15  -15  113
-15  -15  -15  113  -15
-15  -15  113  -15  -15
-15  113  -15  -15  -15
113  113  113  113  113
```

```
1.000 0.980 0.900 0.930 0.950
1.000 0.000 0.000 0.000 0.000
1.000 0.000 0.000 0.000 0.000
0.860 0.940 0.930 0.750 0.000
0.000 0.000 0.000 0.000 0.660
0.000 0.000 0.000 0.000 0.580
1.000 0.970 0.840 0.760 0.000
```

1111110101010010011001110110110100101101111010110101011001001000011100000101111001
0101100110100010011001110000101000010100000100000001

```
1.000 0.980 0.900 0.930 0.950
1.000 0.000 0.000 0.000 0.000
1.000 0.000 0.000 0.000 0.000
0.860 0.940 0.930 0.750 0.000
0.000 0.000 0.000 0.000 0.660
0.000 0.000 0.000 0.000 0.580
1.000 0.970 0.840 0.760 0.000
```

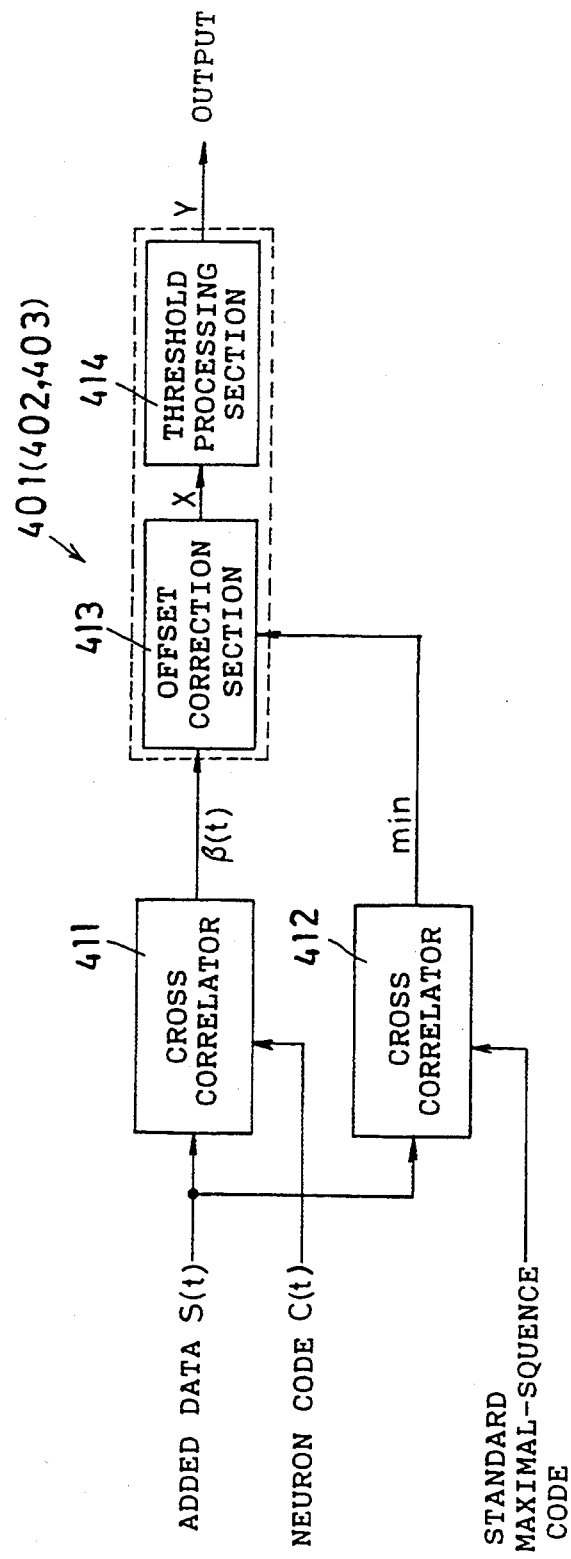

DATA TRANSMISSION AND APPARATUS, DATA PROCESSING APPARATUS AND A NEURAL NETWORK WHICH UTILIZE PHASE SHIFTED, MODULATED, CONVOLUTABLE PSEUDO NOISE

This application is a continuation of application Ser. No. 07/610,239, filed Nov. 7, 1990, now abandoned, which application is entirely incorporated herein by reference.

BACKGROUND OF THE INVENTION

This invention relates to data transmission method and apparatus suitable for transmitting binary data or multiple value data between plural active devices, to data processing apparatus for performing processing based on received plural data to obtain a result, and to a neural network which includes plural neuron devices.

With conventional computer systems, it is widely known that the ability of a computer system as a whole is improved by interconnecting plural processors to one another other than improving the ability of a single processor. In this computer system, when exclusive data transmission channels are used to interconnect each processor to other processors, the number of exclusive data transmission channels increases because plural processors should be interconnected to one another. As a result, the number of interconnectable processors is determined by a limitation of the number of exclusive data transmission channels physically possible to interconnect plural processors. On the other hand, when a data bus is used for transferring data which data bus is common to all processors, the disadvantage of being limited by the number of interconnectable processors is eliminated. Since the system must employ the bus arbitration interfaces for obtaining usage of the data bus for each processor, and must employ the protocols for indicating data sending processor and data receiving processor of data on the data bus, the data transmitting quantity is accordingly decreased. As a result, an ability is obtained which is fairly lower than theoristical ability expected by increasing the number of interconnected processors. When the computer system is required to transfer plural value data, the disadvantages described earlier are raised.

In a neural network, which has attracted wide attention in recent years, the disadvantages described earlier are raised distinctly. The neural network falls into two main groups; one group is a pattern association type, which corrects the weighting factor of the synapses by applying the input signal and teaching signal as a pair (refer to FIG. 21-A). Another group is an automatic association type which corrects the weighting factor of the synapses by applying only input signal (refer to FIG. 21-B).

More particularly, a neural network is intended to raise the speed of pattern recognition and characteristic abstraction and the like by using a device (hereinafter referred to as a neuron device) which realizes the function similar to the function of a nerve cell of a living thing. A neural network generally requires a remarkably large number of neuron devices.

FIG. 22 is a diagram schematically showing a nerve cell. Plural input signals are supplied to a sigma unit through synaptical couplings. An output from the sigma unit is applied to the threshold processing based on a sigmoid fuction, so as to output a signal as an input signal for other nerve cells. The sigma unit includes a terminal which is so called a threshold unit. The sigma unit is controlled by whether or not a signal is to be output therefrom based on level of a signal which is supplied to the threshold unit.

In the nerve cell, each input signal is given weight based on corresponding synaptical coupling, all input signals thus given weight being cumulatively added to obtain an added result. It is controlled by whether or not a signal is to be output from the sigma unit based on the added result and a threshold level. When the signal is to be output from the sigma unit, the signal is converted to a signal within a range of 0 to 1 based on the sigmoid function.

Because the synaptical couplings of a nerve cell are corrected to obtain an aimed result through repeating trial and error and studying processing, each neuron device within a neural network is accordingly required to have a similar function.

The pattern association type neural network requires an input layer, a medium layer and an output layer. Each layer consists of a required number of neuron devices which have an electrical construction equivalent to the schematic diagram of FIG. 22, and requires the electrical interconnection of all neuron devices between the different layers. Accordingly, the number of input signals of each neuron device belonging to the medium layer or the output layer is remarkably increased, but the number of input signal can be increased by only so many because of the physical restrictions of electrical interconnections. Consequently, a number of neuron devices have no practical use outside of research. For example, when pattern recognition of a figure data having $256 \times 256$ pixels is to be performed, a pattern association type neural network requires $256 \times 256$ neuron devices for an input layer. All neuron devices of the input layer are then interconnected to all neuron devices (a number of neuron devices is m, for example) of a medium layer, and all neuron devices of the medium layer are interconnected to all neuron devices (a number of neuron devices is n, for example) of an output layer. As a result, $256 \times 256 \times m + m \times n$ signal lines are required when exclusive signal lines are used, causing actual interconnection being impossible. On the other hand, bus arbitration interfaces become complicated following the increase in the number of neuron devices, and data transmission and cumulative addition are performed in a time sharing manner causing the working ratio decreased. Accordingly, the ability of the neural network as a whole is remarkably decreased. Also, the automatic association type neural network requires the interconnection to one another of all neuron devices which belong to a combination layer and interconnection of input synapses and all neuron devices. As a result, the disadvantages in the pattern association type neural network are greater when the number of neuron devices is the same as the number of neuron devices in the pattern association type neural network.

When input signals of a neuron device which is a part of a neural network are supposed as A, B, C, D and corresponding synaptical coupling (hereinafter referred to as weighting) are supposed as Wi1, wi2, wi3, wi4 (i is the number indicating the neuron device), AWi1, Bwi2, Cwi3, Dwi4 are supplied to the sigma unit $\Sigma$ and cumulatively added. The cumulatively added result Xi ($=AWi1+Bwi2+Cwi3+Dwi4$) is converted to an intermediate value (multiple value data) within a range of 0 to 1 by a sigmoid function $yi = \{1 + e^{(-Xi + \theta)}\}^{-1}$ and output therefrom. FIG. 22 also shows a threshold unit and an input data th which is supplied to the sigma unit Σ and is used for threshold processing. The weighting factors Wi1, wi2, wi3, wi4 are corrected by studying processing. In data transmission between neuron devices, not only binary signals but multiple value data should be output. Consequently, it is necessary to perform analog data transmission or multiple value data transmission instead of the binary data transmission widely employed in digital computer systems, causing the disadvantages above mentioned being increased. Furthermore, the sigma unit Σ is forced to accept a large number of input signals and to change the weighting factor for each input signal. Thus, the neuron device itself becomes complicated in its arrangement and becomes enlarged.

Disadvantages with respect to electric wiring similar to the above mentioned occur not only in neural networks and computer systems consisting of a large number of processors, but they also occur in a local area networks (hereinafter referred to as LAN) and the like.

SUMMARY OF THE INVENTION

It is an object of the present invention to decrease the number of electric wires required for interconnecting a large number of active devices for data transmitting therebetween.

It is another object of the present invention to eliminate the limit of data transmission quantity.

It is still another object of the present invention to perform multiple value data transmission.

It is yet another object of the present invention to decrease the number of electric wires needed for data processing.

A modulation method according to the present invention comprises the steps of:

obtaining plural pseudo noises for modulation by applying phase shifting to a pseudo noise which has significant auto-correlation characteristics, each pseudo noise for modulation having phase shifting applied with individual quantity;

modulating each pseudo noise for modulation based on plural data for transmission; and convoluting the modulated pseudo noises for modulation to obtain transmission data.

When this modulation method is employed, it is not necessary to provide a large number of data transmission lines.

Another modulation method according to the present invention comprises the steps of:

modulating a pseudo noise based on plural data for transmission, the pseudo noise having significant auto-correlation characteristics; and phase shifting each modulated pseudo noise with individual quantity, together with sending out each phase shifted modulated pseudo noise to obtain transmission data which is equivalent to the convoluted modulated pseudo noises.

When this modulation method is employed, the transmission data which is the same as the transmission data of the above-mentioned modulation method is obtained.

A further modulation method according to the present invention comprises the steps of:

obtaining plural pseudo noises for modulation by applying phase shifting to a pseudo noise which has significant auto-correlation characteristics, each pseudo noise for modulation having phase shifting applied with individual quantity;

modulating each pseudo noise for modulation based on at least plural data for transmission; and convoluting the modulated pseudo noises for modulation to obtain transmission data which includes data equivalent to a moduled pseudo noise based on predetermined standard data.

When the modulation method is employed, transmission data including data which is used as a standard when the transmission data is demodulated, is obtained.

Still another modulation method according to the present invention comprises the steps of;

modulating a pseudo noise based on at least plural data for transmission, the pseudo noise having significant auto-correlation characteristics; and phase shifting each modulated pseudo noise and data equivalent to a modulated pseudo noise based on predetermined standard data with individual quantities, together with sending out each phase shifted pseudo noise and the data to obtain transmission data which is equivalent to addition data of the convoluted modulated pseudo noises and data equivalent to the modulated pseudo noise based on predetermined standard data.

When this modulation method is employed, the transmission data which is the same as the transmission data of the above-mentioned modulation method, is obtained.

It is preferable that the pseudo noise is a maximal-sequence code. In this case, the maximal-sequence code must have a code length longer than a total length of the plural data.

When a maximal-sequence code is employed as a pseudo noise, a pseudo noise having a code length corresponding to the number of active devices can easily be generated and can easily be phase shifted. Therefore, a change in the number of active devices can easily be dealt with. As is apparent from the foregoing, a pseudo noise having significant auto-correlation characteristics other than the maximal-sequence code can be employed.

It is also preferable that the standard data unit have a value of "0" or "1".

When the standard data unit have a value of "0" or "1", the data equivalent to a moduled pseudo noise based on predetermined standard data can easily be obtained.

A demodulation method according to the present invention comprises the steps of;

receiving data which is equivalent to data which is obtained by modulating plural pseudo noises for modulation having significant auto-correlation characteristics and having phase shifting applied with individual quantities based on plural data for transmission and by convoluting the modulated pseudo noises;

obtaining pseudo noises, each pseudo noise being applied phase shifting to the pseudo noise with the individual quantity; and demodulating the received data based on the obtained pseudo noises which have the same phase shifting quantities as of the pseudo noises for modulation.

When this demodulation method is employed, the corresponding original data can be extracted from the received data. Bus arbitration interfaces are not needed at all, and the protocols can be simplified.

A data transmission method according to the present invention comprises the steps of;

obtaining plural pseudo noises for modulation by applying phase shifting to a pseudo noise which has significant auto-correlation characteristics, each pseudo noise for modulation having phase shifting applied with individual quantity;

modulating each pseudo noise based on plural data for transmission;

convoluting the modulated pseudo noises to obtain transmission data;

sending out the transmission data;

receiving the transmission data;

obtaining pseudo noises for demodulation, each pseudo noise for demodulation being applied phase shifting to match the pseudo noise with the individual quantity; and demodulating the received data based on the obtained pseudo noises for demodulation which have the same phase shifting quantities as of the pseudo noise for modulation.

When this data transmission method is employed, a large number of data transmission lines are not needed.

Additionally, when this data transmission method is employed, corresponding original data can be extracted from the received data by performing demodulation based on a pseudo noise with a phase shifting quantity, which is the same as the phase shifting quantity for transmission data generation. Thereby bus arbitration interfaces are not needed at all and the protocols can be simplified.

Another data transmission method according to the present invention comprises the steps modulating a pseudo noise based on plural data for transmission, the pseudo noise having significant auto-correlation characteristics;

phase shifting each modulated pseudo noise with individual quantity together with sending out each phase shifted modulated pseudo noise to obtain transmission data which is equivalent to the convoluted modulated pseudo noises;

receiving the transmission data;

obtaining pseudo noises for demodulation, each pseudo noise for demodulation being applied phase shifting to the pseudo noise with the individual quantity; and demodulating the received data based on the obtained pseudo noises for demodulation which have the same phase shifting quantities as of the pseudo noise for modulation.

When this data transmission method is employed, transmission data which is the same as the transmission data of the above-mentioned data transmission method is obtained, and the corresponding original data can be extracted from the received data. As a result, data transmission between active devices which are not clearly classified to a data sending side and a data receiving side can be performed.

A further data transmission method according to the present invention comprises the steps of;

obtaining plural pseudo noises for modulation by applying phase shifting to a pseudo noise which has significant auto-correlation characteristics, each pseudo noise for modulation having phase shifting applied with individual quantity;

modulating each pseudo noise for modulation based on at least plural data for transmission;

convoluting the modulated pseudo noises for modulation to obtain transmission data which includes data equivalent to a moduled pseudo noise based on predetermined standard sending out the transmission data;

receiving the transmission data;

obtaining pseudo noises for demodulation, each pseudo noise fop demodulation being applied phase shifting to match the pseudo noise with the individual quantity; and demodulating the received data based on the obtained pseudo noises for demodulation which have the same phase shifting quantities as of the pseudo noise for modulation.

When this data transmission method is employed, it is not necessary that a large number of data transmission lines be provided.

When this data transmission method is employed, corresponding original data can be extracted from the received data by performing demodulation based on a pseudo noise with a phase shifting quantity which is the same as the phase shifting quantity for transmission data generation and by restoring the data other than the standard data based on the demodulated standard data. Thus, the transmission of multiple value data including intermediate value other than "0" and "1" can securely be performed, bus arbitration interfaces are not needed at all, and the protocols can be simplified.

Still another data transmission method according to the present invention comprises the steps of;

modulating a pseudo noise based on at least plural data for transmission, the pseudo noise having significant auto-correlation characteristics; and phase shifting each modulated pseudo noise and data equivalent to a modulated pseudo noise based on predetermined standard data, with individual quantity together with sending out each phase shifted pseudo noise and the data to obtain transmission data;

receiving the transmission data;

obtaining pseudo noises for demodulation, each pseudo noise for demodulation being applied phase shifting to the pseudo noise with the individual quantity; and demodulating the received data based on the obtained pseudo noises for demodulation which have the same phase shifting quantities as of the pseudo noise for modulation.

When this data transmission method is employed, data transmission between active devices which are not clearly classified to a data sending side and a data receiving side can be performed.

Again it is preferable that the pseudo noise is a maximal-sequence code. In this case, the maximal-sequence code must have a code length longer than a total length of the plural data.

When a maximal-sequence code is employed as a pseudo noise, a pseudo noise having a code length corresponding to a number of active devices, can easily be generated and can easily be phase shifted. Thus, a change in the number of active devices can easily be dealt with. As is apparent from the foregoing, a pseudo noise having significant auto-correlation characteristics other than the maximal-sequence code can be employed.

It is also preferable that the standard data unit have a value of "0" or "1".

When the standard data unit have a value of "0" or "1", multiple value data can easily be restored based on one of the standard data as a reference. The multiple value data may be intermediate data between "0" and "1", or may be data having a value outside the range. When the standard data has a value of "0", a data which is equivalent to a modulated data based on the standard data can be obtained without modulating a pseudo noise based on the standard data actually, thereby simplifying the processes.

A modulation apparatus according to the present invention comprises;

pseudo noise generating means for generating plural pseudo noises for modulation based on a pseudo noise having significant auto-correlation characteristics, the plural pseudo noises for modulation having individual phase shifting quantities;

modulation means for modulating the plural pseudo noises for modulation based on plural data for transmission; and convolution means for convoluting the modulated pseudo noises for modulation.

When this modulation apparatus is employed, it is not necessary that a large number of data transmission lines be provided.

Another modulation apparatus according to the present invention comprises;

modulation means for modulating a pseudo noise based on plural data for transmission, the pseudo noise having significant auto-correlation characteristics;

phase shift means for phase shifting each modulated pseudo noise with individual quantity; and convolution means for convoluting the phase shifted pseudo noises.

When this modulation apparatus is employed, the convoluted data, which is the same as the transmission data of the above-mentioned modulation apparatus, is obtained.

A further modulation apparatus according to the present invention comprises;

pseudo noise generating means for generating plural pseudo noises for modulation based on a pseudo noise having significant auto-correlation characteristics, the plural pseudo noises for modulation having individual phase shifting quantities;

modulation means for modulating each pseudo noise for modulation based on at least plural data for transmission; and convolution means for convoluting the modulated pseudo noises for modulation to obtain transmission data which includes data equivalent to a modulated pseudo noise based on predetermined standard data.

When the modulation apparatus is employed, the transmission data, which includes data used as a standard when the transmission data is demodulated, is obtained.

It is preferable that the modulation means are multipliers and the convolution means is an adder.

When the arrangement is employed, each means can be consisted with wide used electrical parts, thereby the arrangement of the modulation apparatus as a whole can be simplified.

Still another modulation apparatus according to the present invention comprises:

modulation means for modulating a pseudo noise based on plural data for transmission, the pseudo noise having significant auto-correlation characteristics;

phase shift means for phase shifting each modulated pseudo noise with individual quantity; and convolution means for convoluting the modulated pseudo noises to obtain transmission data which includes data equivalent to a modulated pseudo noise based on predetermined standard data.

When this modulation apparatus is employed, the transmission data, which is the same as the transmission data of the above-mentioned modulation apparatus, is obtained.

It is preferable that the modulation means are multipliers, the phase shift means are pipeline registers and the convolution means are adders.

It is also preferable that the modulation means are operational amplifiers and the phase shift means and convolution means are pipeline registers, which are alternatively connected with the operational amplifiers.

It is further preferable that the pseudo noise is a maximal-sequence code. In this case, the maximal-sequence code must have a code length longer than a total length of the plural data.

It is still further preferable that the standard data unit have a value of "0" or "1".

A demodulation apparatus according to the present invention comprises;

receiving means for receiving data which is equivalent to data which is obtained by modulating plural pseudo noises for modulation having significant auto-correlation characteristics and having phase shifting applied with individual quantities based on plural data for transmission and by convoluting the modulated pseudo noises;

pseudo noise generating means for generating pseudo noises for demodulation being applied phase shifting to the pseudo noise with the individual phase shifting quantities which are the same as the individual quantities for the pseudo noises for modulation; and demodulation means for demodulating the received data based on the generated pseudo noises for demodulation.

When this demodulation apparatus is employed, corresponding original data can be extracted from the received data. Thus, bus arbitration interfaces are not needed at all and the protocols can be simplified.

It is preferable that the demodulation means includes a register, an operational amplifier for performing predetermined operations based on the content of the register, received data and maximal-sequence codes to obtain operation results and for supplying the operation results to the register, and an inverter for outputting regeneration data based on the uppermost digit of the register.

Another demodulation apparatus according to the present invention comprises;

receiving means for receiving data which is equivalent to data which is obtained by modulating plural pseudo noises for modulation having significant auto-correlation characteristics and having phase shifting applied with individual quantities based on plural data for transmission and by convoluting the modulated pseudo noises;

pseudo noise generating means for generating pseudo noises for demodulation being applied phase shifting to the pseudo noise with the individual phase shifting quantities which are the same as the individual quantities for the pseudo noises for modulation; and demodulation means for demodulating the received data based on the generated pseudo noises for demodulation to obtain demodulation data including standard data; and restoration means for restoring data other than the standard data based on the demodulated standard data.

When this demodulation apparatus is employed, corresponding original data can be extracted from the received data by performing demodulation based on a pseudo noise with a phase shifting quantity which is the same as the phase shifting quantity for the transmission data generation and by restoring the data other than the standard data based on the demodulated standard data. Thus, transmission of multiple value data, including intermediate value other than "0" and "1", can securely be performed. Bus arbitration interfaces are not needed at all, and the protocols can be simplified.

It is preferable that the demodulation means includes a first register, a shifter for shifting a standard maximal-sequence code with a predetermined phase, a second register for holding received data, and an operational amplifier for performing predetermined operations based on the content of the first register, received data, a maximal-sequence code output from the shifter and received data output from the second register to obtain operation results and for supplying the operation results to the first register.

A data transmission apparatus according to the present invention comprises;

pseudo noise generating means for generating plural pseudo noises for modulation based on a pseudo noise having significant auto-correlation characteristics, the plural pseudo noises for modulation having individual phase shifting quantities;

modulation means for modulating the plural pseudo noises based on plural data for transmission; and convolution means for convoluting the modulated pseudo noises for modulation to obtain convoluted data; and demodulation means for demodulating the convoluted data based on pseudo noises which are the same as the pseudo noises for modulation.

When this data transmission apparatus is employed, a large number of data transmission lines are not required.

When this data transmission apparatus is employed, corresponding original data can be extracted from the received data by performing demodulation based on a pseudo noise with a phase shifting quantity which is the same as the phase shifting quantity for transmission data generation. Again, bus arbitration interfaces are not needed at all and the protocols can be simplified.

It is preferable that the modulation means are multipliers, the convolution means is an adder, and the demodulation means includes a register, an operational amplifier for performing predetermined operations based on the content of the register, the received data and a maximal-sequence code to obtain operation results and for supplying the operation results to the register, and an inverter for outputting regeneration data based on the uppermost digit of the register.

Another data transmission apparatus according to the present invention comprises;

modulation means for modulating a pseudo noise based on plural data for transmission, the pseudo noise having significant auto-correlation characteristics;

phase shift means for phase shifting each modulated pseudo noise with individual quantity;

convolution means for convoluting the phase shifted pseudo noises to obtain convoluteded data; and demodulation means for demodulating the convoluted data based on pseudo noises which are phase shifted with individual phase shifting quantities which are the same as the individual phase shifting quantities of the pseudo noises for modulation.

When this data transmission apparatus is employed, the transmission data, which is the same as the transmission data of the above-mentioned data transmission apparatus, is obtained, and corresponding original data can be extracted from the received data. As a result, data transmission between active devices which are not clearly classified to a data sending side and a data receiving side can be performed.

It is preferable that the modulation means are multipliers, the phase shift means and convolution means are pipeline registers which are alternatively connected with the operational amplifiers, and the demodulation means includes a register, an operational amplifier for performing predetermined operations based on the content of the register, the received data and a maximal-sequence code to obtain operation results and for supplying the operation results to the register, and an inverter fop outputting regeneration data based on the uppermost digit of the register.

A further data transmission apparatus according to the present invention comprises;

pseudo noise generating means for generating plural pseudo noises for modulation based on a pseudo noise having significant auto-correlation characteristics, the plural pseudo noises for modulation having individual phase shifting quantities;

modulation means for modulating the plural pseudo noises for modulation based on at least plural data for transmission;

convolution means for convoluting the modulated pseudo noises for modulation to obtain convoluted data which includes data equivalent to a modulated pseudo noise based on predetermined standard data;

demodulation means fop demodulating the convoluted data based on pseudo noises which are the same as the pseudo noises for modulation; and restoration means for restoring data other than the standard data based on the demodulated standard data.

When this data transmission apparatus is employed, the need for a large number of data transmission lines is eliminated.

When this data transmission apparatus is employed, corresponding original data can be extracted from the received data by performing demodulation based on a pseudo noise with a phase shifting quantity which is the same as the phase shifting quantity for transmission data generation and by restoring the data other than the standard data based on the demodulated standard data. Thus, transmission of multiple value data including intermediate values other than "0" and "1" can securely be performed, bus arbitration interfaces are not needed at all and the protocols can be simplified.

It is preferable that the modulation means are multipliers, the convolution means is an adder, and the demodulation means includes a first register, a shifter for shifting a standard maximal-sequence code with predetermined phase, a second register for holding the received data, and an operational amplifier for performing predetermined operations based on the content of the first register, the received data, a maximal-sequence code output from the shifter and the received data output from the second register to obtain operation results and for supplying the operation results to the first register.

Still another data transmission apparatus according to the present invention comprises;

modulation means for modulating a pseudo noise based on at least plural data for transmission, the pseudo noise having significant auto-correlation characteristics;

phase shift means for phase shifting each modulated pseudo noise with individual quantity;

convolution means for convoluting the phase shifted modulated pseudo noises to obtain convoluted data which includes data equivalent to a modulated pseudo noise based on predetermined standard data;

demodulation means for demodulating the convoluted data based on pseudo noises which are the same as the pseudo noises for modulation; and restoration means for restoring data other than the standard data based on the demodulated standard data.

When this data transmission apparatus is employed, data transmission between active devices which are not clearly classified to a data sending side and a data receiving side can be performed.

It is preferable that the modulation means are multipliers, the phase shift means and convolution means are pipeline registers which are alternatively connected with the operational amplifiers, and the demodulation means includes a first register, a shifter for shifting a standard maximal-sequence code with predetermined phase, a second register for holding received data, and an operational amplifier for performing predetermined operations based on the content of the first register, the received data, a maximal-sequence code output from the shifter and the received data output from the second register to obtain operation results and for supplying the operation results to the first register.

A data processing apparatus according to the present invention comprises;

receiving means for receiving data which is equivalent to data which is obtained by modulating plural pseudo noises for modulation having significant auto-correlation characteristics and having phase shifting applied with individual quantities based on plural data for transmission and by convoluting the modulated pseudo noises;

cross-correlation means for data for obtaining cross-correlation values of the convoluted data with previously obtained time sequence data based on a pseudo noise and weighting factor for each data;

cross-correlation means for standards for obtaining cross-correlation values of the convoluted data with a pseudo noise having predetermined phase shifting quantity; and processing means for performing predetermined processing based on both cross-correlation values to obtain output data.

When this data processing apparatus is employed, the arrangement of the apparatus is remarkably simplified because the apparatus is comprised of only two cross-correlation means and one processing means.

It is preferable that the cross-correlation means for standards generates a cross-correlation value corresponding to the "0" level, and that the cross-correlation means for standards supplies the cross-correlation value as a common value to plural data processing apparatus.

When this arrangement is employed, the layout of the apparatus is further simplified because the required number of the cross-correlation means is one.

It is also preferable that the cross-correlation means for standards generates a value which is included in a weighting factor to the cross-correlation value.

When the arrangement is employed, the processing load of the processing means can be decreased. If the processing load is not required to be decreased, the cross-correlation means for standards may generate the cross-correlation value simply.

It is further preferable that the processing means performs offset correction processing and threshold processing based on the cross-correlation values output from both cross-correlation means.

When this arrangement is employed, variations of the cross-correlation caused by the number of pseudo noises convoluted can be compensated, and accurate multiple value data can be generated based on the compensated cross-correlation values.

Another data processing apparatus according to the present invention comprises;

receiving means for receiving data which is equivalent to data which is obtained by modulating plural pseudo noises for modulation having significant auto-correlation characteristics and having phase shifting applied with individual quantities based on plural data for transmission and by convoluting the modulated pseudo noises;

cross-correlation means for data for obtaining cross-correlation values of the convoluted data with previously obtained time sequence data based on weighting factors for each data and on the difference between the pseudo noise and a pseudo noise corresponding to the standard data.

When this data processing apparatus is employed, data which is the same as the data of the above-mentioned data processing apparatus can be obtained by the cross-correlation means for data. The arrangement of the apparatus is remarkably simplified because the cross-correlation means for the standard and the processing means can be omitted.

A neural network according to the present invention comprises;

plural data processing apparatus which are classified to an input layer, intermediate layer and output layer of a neural network;

modulation means for modulating pseudo noises which are phase shifted with individual phase shifting quantities based on output data from all the data processing apparatus of the input layer or from all the data processing apparatus of the intermediate layer; and convolution means for convoluting the output data from each modulation means and for supplying the convoluted data to the data processing apparatus of the next layer through a common data transmission channel, wherein the data processing apparatus includes receiving means for receiving data as a convoluted data which is equivalent to data which is obtained by modulating plural pseudo noises for modulation having significant auto-correlation characteristics and having phase shifting applied with individual quantities based on plural data for transmission and by convoluting the modulated pseudo noises, cross-correlation means for data for obtaining cross-correlation values of the convoluted data with previously obtained time sequence data based on a pseudo noise and weighting factors for each data, cross-correlation means for standards for obtaining cross-correlation values of the convoluted data with a pseudo noise having predetermined phase shifting quantity, and processing means for performing predetermined processing based on both cross-correlation values to obtain output data.

When this neural network is employed, the modulation means modulates pseudo noises having individual phase shifting quantities based on output data output from all data processing apparatus which serve as neuron devices and belong to the input layer; then, the convolution means convolutes all modulated pseudo noises and supplies the convoluted modulated pseudo noises to all data processing apparatus which serve as neuron devices and belong to the intermediate layer through the common data transmission channel. Thereafter, the modulation means modulates pseudo noises having individual phase shifting quantities based on output data output from all data processing apparatus which serve as neuron devices and belong to the intermediate layer. Next, the convolution means convolutes all modulated pseudo noises and supplies the convoluted modulated pseudo noises to all data processing apparatus which serve as neuron devices and belong to the output layer through the common data transmission channel. In each neuron device, the convoluted modulated pseudo noises are received by the cross-correlation means for data and cross-correlation means for standards. The cross-correlation means for data obtains cross-correlation values of the convoluted modulated pseudo noises with the previously obtained time sequence data based on the pseudo noise and weighting factors for each data, while the cross-correlation means for standards obtains cross-correlation values of the convoluted data with the pseudo noise having predetermined phase shifting quantity. Thus, multiple value data can be obtained by performing predetermined processing by the processing means based on both cross-correlation values. These processings are performed by all neuron devices simultaneously; pattern recognition, characteristic extraction and the like, which are determined by the previously determined weighting factor fop each neuron device, are perfomed.

It is preferable that the pseudo noise is a maximal-sequence code. In this case, the maximal-sequence code must have a code length greater than the number of neuron devices of each layer.

When a maximal-sequence code is employed as a pseudo noise, a pseudo noise having an optimum code length corresponding to a variation of numbers of neuron devices, can easily be generated. This means a neural network which is optimum to species and quantity of data for processing can easily be arranged.

More specifically, a maximal-sequence code is the longest sequence of code within codes which can be generated by shift registers having a predetermined number of stages or a feedback code generator made of delay devices, and is so called maximal periodic sequences or the longest sequences. The maximal-sequence code may be in the form of a modulo-j code where j is an arbitrary number; a binary system code is used in the following explanation. The binary system code has the following characteristics:

(1) The difference between the number of appearances of "0" and the number of appearances of "1" within one period of a series is only 1 bit. That is, when a binary system code having a bit length of $2^n-1$ is employed, the number of appearances of "1" is $2^{n-1}$, while the number of appearances of "0" is $2^{n-1}-1$. Concretely, when n=3, the binary system code is "1 0 1 1 1 0 0" for example, and the number of appearances of "1" is greater than that of "0" by 1.

(2) The statistical distribution of "0" and "1" is constant. The relative position of strings of "0" and "1" vary depending on the binary system code, but the number of appearances of a string having a predetermined length is constant for all binary system codes which have the same bit length as one another.

(3) Referring to FIG. 20, the auto-correlation value of the binary system code is $2^n-1$ (which is equal to the bit length) for 0 bit shift, while the auto-correlation value of the binary system code is $-1$ for an arbitrary number of bit shift other than the bit shift range of $0\pm1$. The auto-correlation value of $-1$ is obtained by counting the number of coincidence portions, and the value of $-1$ indicates that the number of dissonances is greater than the number of coincidence by 1. Further, the auto-correlation value varies linearly from $-1$ to $2^n-1$ within the bit shift range of $1\pm1$.

(4) Summation with a modulo-2 of an original binary system code and a phase shifted original binary system code with predetermined phase shifting quantity is another phase shifted original binary system code which phase shifting quantity is different from the predetermined phase shifting quantity.

(5) All inner state which are able to be obtained by an n-steps shift register generator appear in a binary system code at a predetermined clock time within one period. That is, each inner state appears only one time, and within only one clock time.

It is widely known that a noise has significant auto-correlation characteristics and auto-correlation values of the noise are negligible when the noise is shifted slightly. The maximal-sequence code can be used as a pseudo noise because the maximal-sequence code has the characteristic similar to the characteristic mentioned above following the lengthening of the bit length.

The inventor advanced the researches for pseudo noises represented by maximal-sequence codes and found new characteristics as follows:

When the code of "0" in maximal-sequence codes is replaced with the code of "$-1$", cross-correlation of a standard maximal-sequence code with a serial code which is obtained by convoluting plural maximal-sequence codes, each maximal sequence code being obtained by phase shifting the standard maximal-sequence code with individual phase, is the same as a sum of cross-correlations of the standard maximal-sequence code with individual maximal-sequence code.

The difference between the peak value and lowest value of the cross-correlation is a constant value which is determined based on the bit length of the maximal-sequence code, despite of the varying the peak value and lowest value of the cross-correlation in correspondence with the convolution number of maximal-sequence codes.

The inventor worked out this present invention based on the findings.

When a standard maximal-sequence code "1 0 1 1 1 0 0" having a bit length of $2^3-1$, shown in FIG. 1-A1, is taken into consideration for example, maximal-sequence codes which are phase shifted with +1 bit, +2 bits and +4 bits are "0 1 0 1 1 1 0", "0 0 1 0 1 1 1" and "1 1 0 0 1 0 1" (refer to FIG. 1-B1, 1-Cl, 1-D1). A sequence code which is obtained by convoluting the maximal-sequence codes phase shifted with +1 bit, +2 bits and +4 bits respectively, is shown in FIG. 1-E1. When cross-correlation of these sequence codes with the standard maximal-sequence code is obtained, peaks having the same value as the peak of the auto-correlation (refer to FIG. 1-A2) are obtained respectively at the phase shifted position with +1 bit, +2 bits and +4 bits (refer to FIGS. 1-B2, 1-C2 and 1-D2) with respect to the auto-correlation for the maximal-sequence codes which are phase shifted with +1 bit, +2 bits and +4 bits. Furthermore, peaks having lower value than the peak of the auto-correlation are obtained at every phase shifted position with +1 bit, +2 bits and +4 bits (refer to FIG.

1-E2) with respect to the auto-correlation for the convoluted sequence codes. The peak value of the cross-correlation shown in FIG. 1-E2 is 5, and is lower than the peak values 7 ($=2^3-1$) of the cross-correlation shown in FIGS. 1-B2, 1-C2 and 1-D2 by 2. The value at a position apart from the peak by more than 1 bit is $-3$ in FIG. 1-E2, while each value at positions apart from the peak by more than 1 bit is $-1$, as shown in FIG. 1-B2, 1-C2 and 1-D2. The former value $-3$ is lower than the latter values $-1$ by 2. That is, cross-correlation which is the same as the cross-correlation shown in FIG. 1-E2 is obtained by simply adding the cross-correlations shown in FIGS. 1-B2, 1-C2 and 1-D2. The difference between the maximum value and the minimum value is 8 ($=2^3$) for all cross-correlations. Furthermore, when maximal-sequence codes which are phase shifted with 0 bit to $+6$ bits respectively are added, the peak value of the cross-correlation is 1. The peak value never becomes negative despite of varying the peak value in correspondence with the number of maximal sequence codes to be added.

This present invention is made based on the findings mentioned above. The number of electrical data transmission lines can be determined as 1 in spite of the amount of data for transmission by modulating a pseudo noise having strong auto-correlation characteristic with plural binary data and by sending out the modulated pseudo noises with phase shifting, the phase of each pseudo noise being different from one another. And in a data receiving side, original binary data can be reproduced by obtaining cross-correlations of received sequence code with pseudo noises which are phase shifted with corresponding quantities, each of which corresponds to each binary data to be reproduced, and by deciding whether or not the peak value of the cross-correlation is negative.

A number of electrical data transmission lines can be determined as 1 in spite of the amount of data for transmission by modulating a pseudo noise having significant auto-correlation characteristics with plural multiple value data and a predetermined standard data, and by sending out the modulated pseudo noises with phase shifting, the phase of each pseudo noise being different from one another. And in a data receiving side, original multiple value data can be reproduced by obtaining cross-correlations of received sequence code with pseudo noises which are phase shifted with corresponding quantities, each of which corresponds to each multiple value data to be reproduced, and by performing operations based on the difference between the obtained cross-correlation and the cross-correlation for the reproduced predetermined standard data and the difference between the peak value and the lowest value.

The inventor intended to produce a neuron device based on the knowledge mentioned above. The number of cross-correlators and delaying registers increases proportionaly to the increase in the amount of input data, thereby causing the arrangement of the neuron device to become remarkably complicated. The reason is that an convoluted data is supplied to the cross-correlators, the number of which is equal to the number of input data. Each cross-correlator is supplied the maximal-sequence code which is phase shifted with a phase shifting quantity differing from the others by intervening delaying registers between neighboring cross-correlators. Cross-correlation values obtained by corresponding cross-correlators are supplied to a sigma unit $\Sigma$ through synaptical couplings, and an output data from the sigma unit $\Sigma$ is converted to an intermediate value data by a sigmoid function. Then, the intermediate data is output therefrom.

When the number of input data excluding a channel for giving a standard level of the neuron device is determined as L (where $1 \leq L \leq 2^n - 2$, and the bit length of the maximal-sequence code is $2^n - 1$), 1 clock time of the maximal-sequence code is determined as $\Delta T$ and the j-th input data is determined as xj. An convoluted sequence code S(t) is therefore expressed by the equation of $$S(t) = \sum_{j=1}^{L} xj \cdot m(t + j\Delta T).$$

The j-th reproduces data Xj which is obtained by the cross-correlator, and is expressed by the equation of $Xj = (\phi j - \min)/(\max - \min)$. Where $\phi j$ is a cross-correlation value, max and min are cross-correlation values of channels which correspond to the "1" level and "0" level respectively. The reproduced data Xj is expressed by the following equation because $\max - \min = 2^n$:

$$\begin{aligned}
Xj &= 2^{-n}(\phi j - \min) \\
&= 2^{-n} \sum_{k=1}^{2^n-1} S(t + k\Delta T) m(t + k\Delta T + j\Delta T) - \\
&\quad 2^{-n} \sum_{k=1}^{2^n-1} S(t + k\Delta T) m(t + k\Delta T)
\end{aligned}$$

The sigma unit $\Sigma$ includes L-th number of synaptical couplings because the sigma unit Z receives L-th number of input data. When a weighting factor is determined as wj for the j-th channel, an output data y output from the sigma unit ($\Sigma$) is expressed by the following equation;

$$\begin{aligned}
y &= \sum_{j=1}^{L} Xj wj \\
&= \sum_{j=1}^{L} 2^{-n}(\phi j - \min) wj \\
&= 2^{-n} \left( \sum_{j=1}^{L} \phi j wj - \min \Sigma wj \right) \\
&= 2^{-n} \left[ \sum_{j=1}^{L} \left( \sum_{k=1}^{2^n-1} S(t + k\Delta T) m(t + k\Delta T + j\Delta T) \right) wj - \min \sum_{j=1}^{L} wj \right] \\
&= 2^{-n} \left[ \sum_{k=1}^{2^n-1} \left\{ S(t + k\Delta T) \sum_{j=1}^{L} wj m(t + k\Delta T + j\Delta T) \right\} - \min \sum_{j=1}^{L} wj \right]
\end{aligned}$$

The weighting factor for each channel varies during the studying process and finally becomes a constant value after sufficient studying is performed. The maximal-sequence code for data reproduction is previously known. Then, a sequence code C(t) (hereinafter referred to as a neuron code C(t)) can be previously obtained. The neuron code C(t) is expressed by the equation of $$C(t) = \sum_{j=1}^{L} wjm(t + j\Delta T).$$

Next, the output data y is expressed by the equation of $$y = 2^{-n} \left[ \sum_{k=1}^{2^n-1} \{S(t + k\Delta T)C(t + k\Delta T)\} - \min \sum_{j=1}^{L} wj \right].$$

As is apparent from the foregoing, arrangement of the neuron device as a whole can be simplified because the output data y can be obtained by providing only a cross-correlator for obtaining a cross-correlation value expressed by $$\sum_{k=1}^{2^n-1} \{S(t + k\Delta T)C(t + k\Delta T)\}$$

based on the previously obtained neuron code C(t), and a cross-correlator for obtaining a cross-correlation value min which corresponds to "0" level. Further, arrangement of a neural network as a whole can be simplified because each neuron device can be simplified. Also, arrangement of the neural network as a whole can be further simplified because the number of electrical data transmission lines can be determined as 1 in spite of the number of input data, or the number of neuron devices of the prior layer by modulating a pseudo noise having significant auto-correlation characteristics with plural intermediate value data and a predetermined standard data, and by sending out the modulated pseudo noises with phase shifting, the phase of each pseudo noise being different from each other.

In the foregoing, reproduction of intermediate value data based on the cross-correlation value min is described in detail. The intermediate value data can be reproduced based on the cross-correlation value max which corresponds to a "1" level.

These and other objectives, features and advantages of the present invention will be more readily understood upon consideration of the present invention, taken in conjunction with the accompanying drawings. uppermost digit.

BRIEF DESCRIPTION OF THE DRAWINGS

FIG. 1-A1, 1-B1, 1-C1, 1-D1, 1-E1, 1-A2, 1-B2, 1-C2, 1-D2, AND 1-E2 are a group of schematic diagrams for explaining newly found characteristics of a maximal-sequence code;

FIG. 8A, 8B, 8C and 8D are a group of schematic diagrams showing data transmission operation of the specific sample shown in FIG. 7;

FIG. 15 is a block diagram showing a neuron device as an embodiment of a data processing apparatus according to the present invention;

DETAILED DESCRIPTION OF THE PREFERRED EMBODIMENTS

First Embodiment

Figure 2:
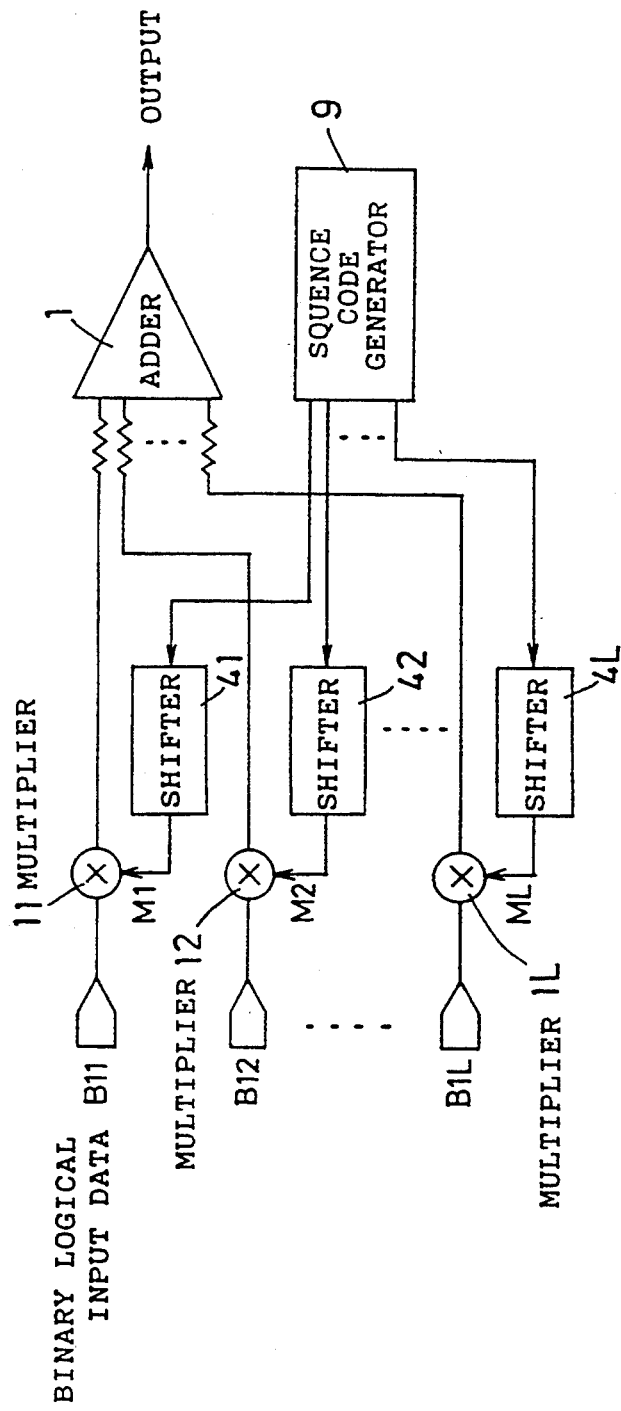
FIG. 2 is a block diagram showing a data sending side of a data transmission apparatus of an embodiment according to the present invention.

FIG. 2 is a block diagram showing a data sending side of a data transmission apparatus of an embodiment according to the present invention. In the data sending side, binary logical input data B11, B12, ... B1L for L channels which are independent from one another are supplied to an adder 1, which functions as an convolution means through multiplication devices 11, 12 ... 1L which function as modulation means, respectively. Also, maximal-sequence codes M1, M2 ... ML which are phase shifted by (different numbers of) individual bits by shifters 41, 42 ... 4L are supplied to the multipliers 11, 12 ... 1L. The maximal-sequence codes have a code length longer than L bits and are supplied to corresponding multipliers after being phase shifted with (different numbers of) individual bits.

Figure 4:
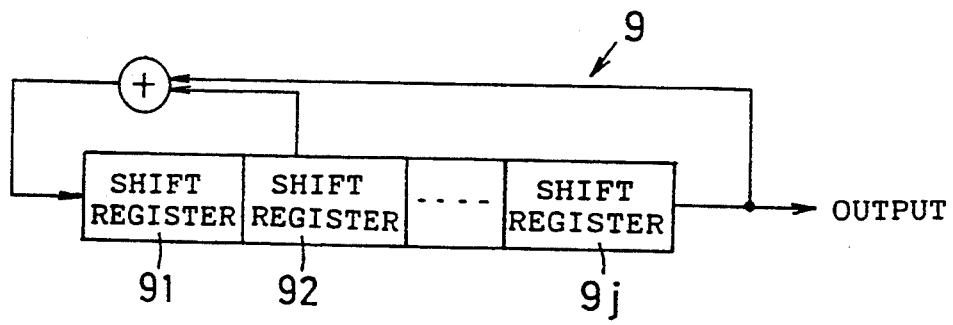
FIG. 4 is a schematic diagram showing a sample of an apparatus for generating a maximal-sequence code.

FIG. 4 is a schematic diagram showing a sample of a sequence code generator, in which number of shift registers 91, 92 ... 9j are serially connected, and the output data from the shift register 9j of the output stage and output data from the shift register of a predetermined stage are applied to an exclusively logical add operation to obtain an exclusively logical add result. The exclusively logical add result is then supplied to the shift register of first stage 91. The number j of stages of the shift registers is determined as $2^j-1 \geq L$, and the exclusively logical add result based on the shift register of the predetermined stage (predetermined tap position) is feedbacked to the shift register of the first stage, so as to repeat the same bit pattern with a cycle of $2^j-1$ times. Further, a conversion circuit (not shown) is provided for converting the "0" level of the binary data output from the shift register 9j of the output stage to the "−1" level.

Operations of the data sending side are as follows. Operations are described in a case in which it is supposed that L=4, but it is of course applicable to a case in which a number of data is determined as an arbitrary number. Also, the bit length of the maximal-sequence code is determined as $2^3-1$, but a maximal-sequence code having an arbitrary bit length of $2^n-1$ is of course applicable.

It is supposed that the binary logical input data B11, B12, B13 and B14 are "1", "1", "0" and "1", a standard maximal-sequence code is "1 −1 1 1 1 −1 −1" and maximal-sequence codes "−1 1 −1 1 1 1 −1", "−1 −1 1 −1 1 1 1", "1 −1 −1 1 −1 1 1" and "1 1 −1 −1 1 −1 1" which are sequentially phase shifted by 1 bit are supplied to multipliers 11, 12, 13 and 14 respectively.

Sequence codes of "−1 1 −1 1 1 1 −1", "−1 −1 1 −1 1 1 1", "0 0 0 0 0 0 0" and "1 1 −1 −1 1 −1 1" are output from the multipliers 11, 12, 13 and 14 respectively. The convoluted serial code of "−1 1 −1 −1 3 1 1" is sent out from an adder 1 by adding the serial codes with the adder 1.

Figure 5:
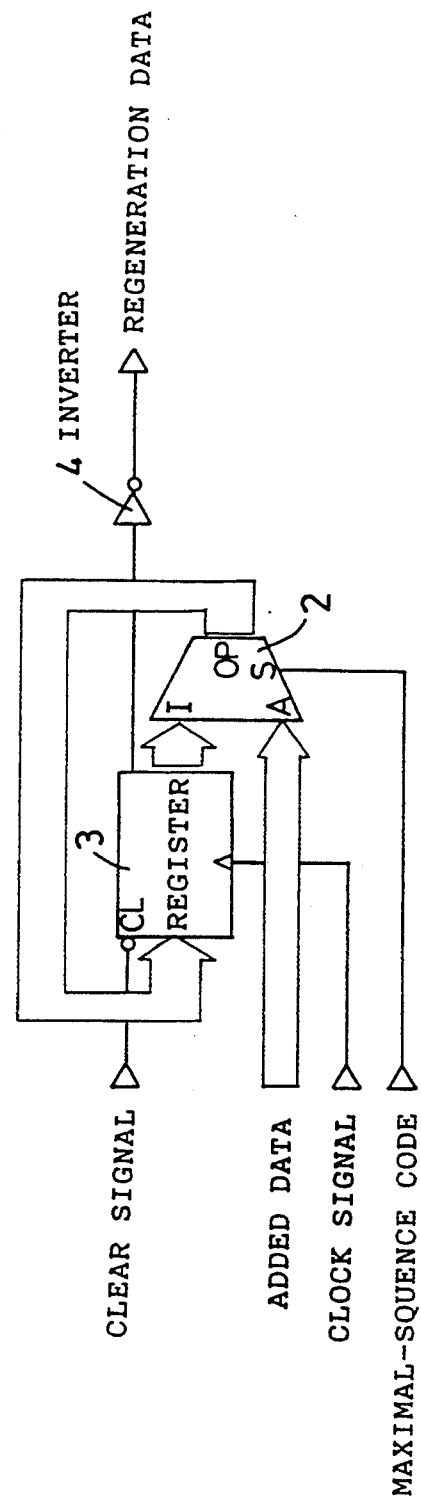
FIG. 5 is a block diagram showing a data receiving side of a data transmission apparatus of an embodiment according to the present invention.

FIG. 5 is a block diagram showing a data receiving side of the data transmission apparatus of the embodiment according to the present invention. In the data receiving side, the convoluted data is supplied to one input terminal A of an operational amplifier 2 while the contents of a register 3 is supplied to another input terminal I thereof, the operational amplifier 2 being supplied a maximal-sequence code as a control data which is phase shifted with a phase shifting quantity corresponding to a channel to be regenerated. An operation result output from an output terminal OP of the operational amplifier 2 is feedbacked to the register 3. The uppermost digit of the register 3 is output as regenerated data therefrom through an inverter 4. The operational amplifier 2 is established to output operation results in a form of compliment of 2. The operational amplifier 2 is also established to perform an operation of OP=I+A when the maximal-sequence code is "1" and to perform an operation of OP=I−A when the maximal-sequence code is "0". The register 3 is established to output the uppermost digit and to be cleared of its contents at every supplying of a number of clock signals, the number being equal to the number of bits of the maximal-sequence code.

When the convoluted data of "−1 1 −1 −1 3 1 1" is supplied to the input terminal A of the operational amplifier 2 and an 1 bit phase shifted maximal-sequence code of "0 1 0 1 1 1 0" is supplied to the operational amplifier 2 as the control data for example, the following operations are sequentially performed.

0−(−1)=1
1+1=2
2−(−1)=3
3+(−1)=2
2+3=5
5+1=6
6−1=5

Then, the uppermost bit "0" of the value 5 which is finally obtained is output from the register 3. The uppermost bit is converted to "1" by the inverter, the converted value being the original binary logical input data B11. That is, the original binary logical input data B11 is regenerated. The other binary logical input data B12, B13 and B14 are also regenerated by performing the similar operations based on maximal-sequence codes which are phase shifted with 2 bits, 3 bits and 4 bits respectively.

Second Embodiment

Figure 6:
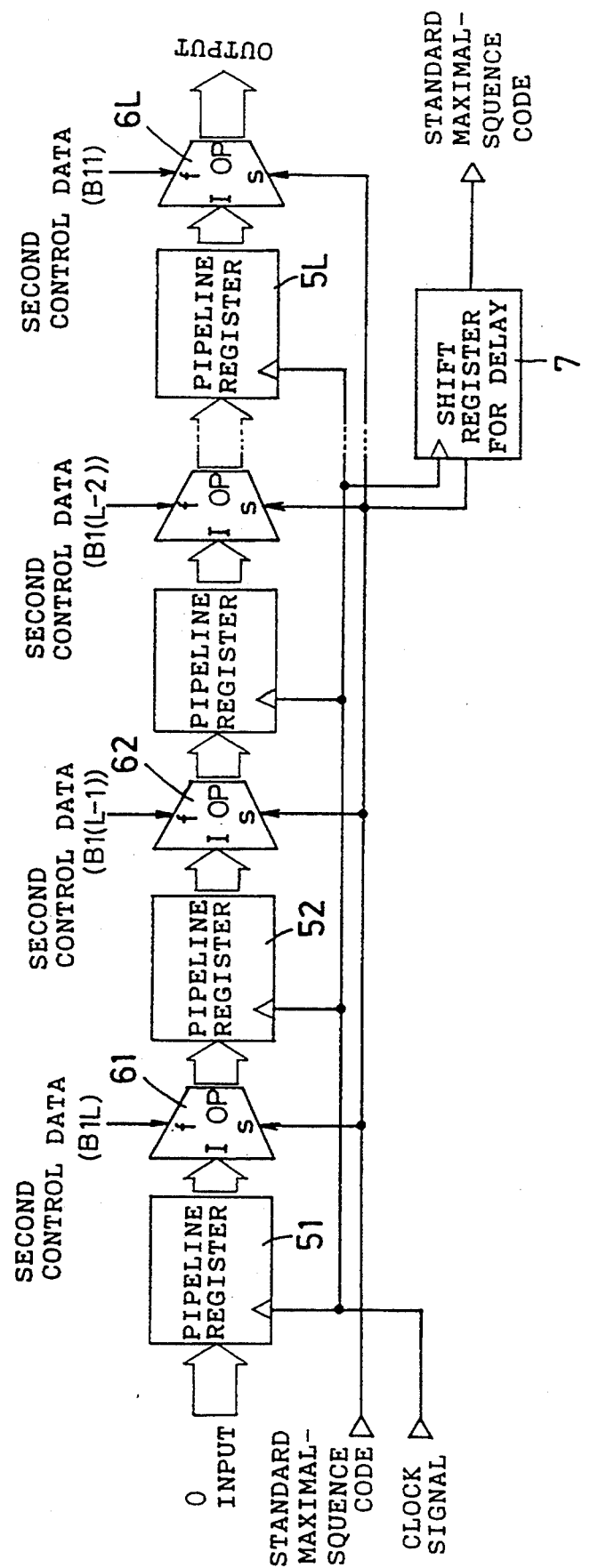
FIG. 6 is a block diagram showing another data sending side of a data transmission apparatus of an embodiment according to the present invention.

FIG. 6 is a block diagram showing a data sending side of another embodiment of a data transmission apparatus according to the present invention, In the data sending side, L-number of pipeline registers 51, 52 ... 5L which unite phase shifting means and convolution means, and L-staged shift registers 7 for delay for outputting a standard maximal-sequence code are included. The contents of each pipeline register is supplied to an input terminal I of a corresponding operational amplifier, and an operation result OP of the operational amplifier is supplied to the next pipeline register. All pipeline registers 51, 52 ... 5L and the shift register 7 are supplied with the same clock signal, all operational amplifiers 61, 62 ... 6L are supplied a maximal-sequence code as a first control data S, and each operational amplifier is supplied binary logical input data B1L ... B12, B11 for transmission as second control data f. All operational amplifier 61, 62 ... 6L are established to output a supplied value to the input terminal I as it is when the second control data f is "0", to perform an operation of OP=I−1 under the condition that the first control data S is "0" and the second control data f is "1" and to perform an operation of OP=I+1 under the condition that the first control data S is "1" and the second control data f is "1". The first stage pipeline register 51 is supplied "0" data.

In this embodiment, the maximal-sequence codes having the same phase are supplied to all operational amplifiers 61, 62 ... 6L and a pipeline arrangement is employed, thereby performing similar operations as the embodiment shown in FIG. 2. Furthermore, this embodiment eliminates the limit of number of binary logical input data because this embodiment can deal with the increase of the number of binary logical input data by increasing the number of stages of the pipeline arrangement in comparison with the embodiment shown in FIG. 2, being able to deal with a maximum about 100 binary logical input data by one adder 1.

Specific Example 1

Figure 7:
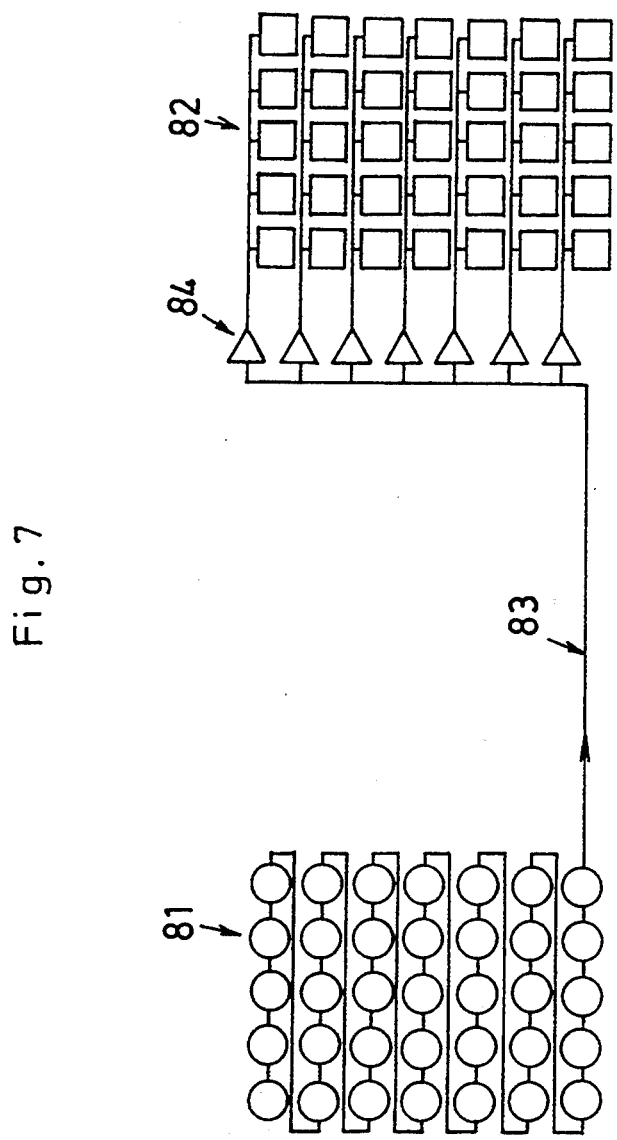
FIG. 7 is a schematic diagram showing a specific sample of an apparatus for transmitting two dimensional data.

FIG. 7 is a schematic diagram showing a specific sample of an apparatus for transmitting two dimensional data. In this example, 35 input units 81, each of which includes pipeline registers and operational amplifiers, are connected in pipeline form, and 35 regeneration units 82, each of which includes an operational amplifier, a register and an inverter, are connected in parallel. The apparatus further includes a data bus 83 and buffers 84.

In this embodiment, 5×7 binary logical input data which represent the figure of 2 as shown in FIG. 8-A are supplied to the input units 81. Then, data is transmitted using a maximal-sequence code having a 127 bit length as shown in FIG. 8-B. Thereafter, binary logical data is regenerated by regeneration units 82 which are disposed in correspondence with the input units 81. As a result, cross-correlation values as shown in FIG. 8-C are obtained, and binary logical data as shown in FIG. 8-D are regenerated. That is, 5×7 binary logical data which represent the original figure of 2 are regenerated accurately.

As is apparent from the foregoing, it is necessary to use the maximal-sequence code which is the same as the maximal-sequence code used for modulation, when data is regenerated, thereby keeping the secrecy of transmission data maintained securely. Also, the transmission data is held in a distributed form in the whole extent of the maximal-sequence code. Therefore, data can be regenerated with a fairly high accuracy even when data is partially lost.

Third Embodiment

Figure 9:
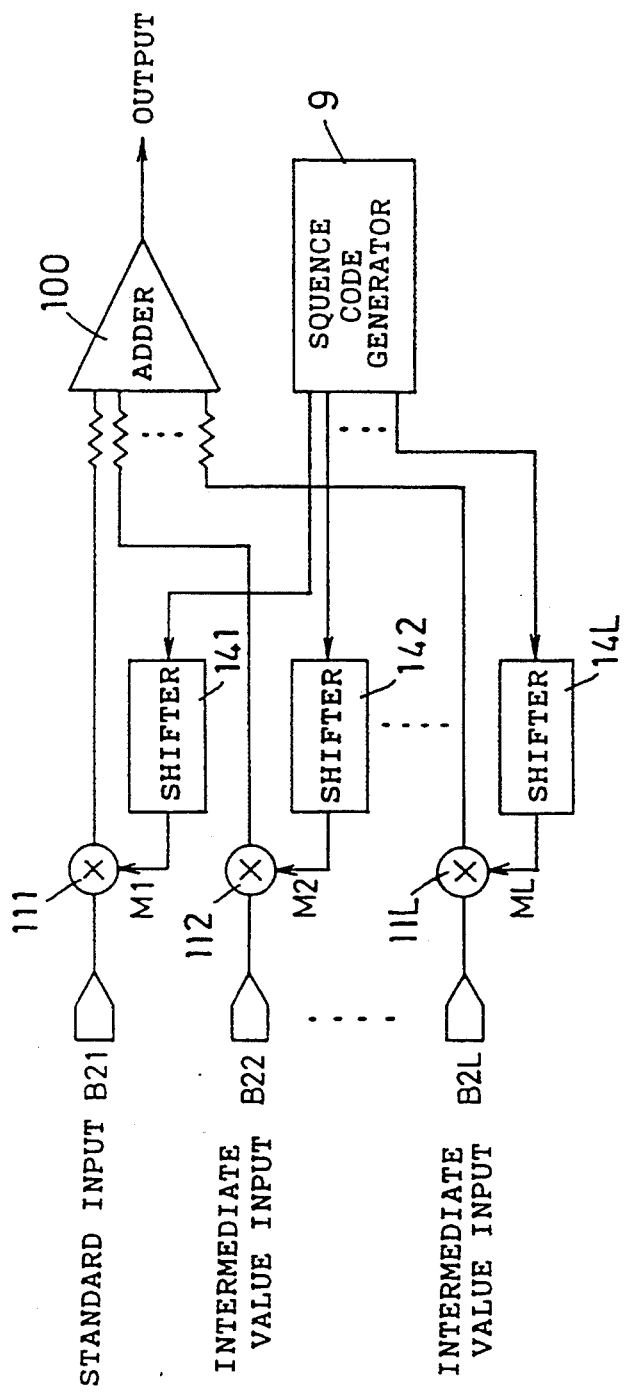
FIG. 9 is a block diagram showing a data sending side of a data transmission apparatus of another embodiment according to the present invention.

FIG. 9 is a block diagram showing a data sending side of a data transmission apparatus of another embodiment according to the present invention.

This embodiment differs from the embodiment shown in FIG. 2 in that a standard input data B21 having a known level and multiple value input data B22, B23 ... B2L for (L—1) channels which are independent from each other are supplied to multipliers 111, 112 ... 11L, which function as modulation means respectively.

Operations of the data sending side having the arrangement mentioned above are as follows. Operations are described in a case in which it is supposed that L=4 and the bit length of the maximal-sequence code is determined as $2^3-1$, but it is of course applicable to a case in which a number of data is determined as an arbitrary number and a maximal-sequence code having an arbitrary bit length of $2^n-1$.

It is supposed that the standard input data B21 and intermediate input data B22, B23 and B24 which are samples of multiple value input data are "0", "0.5", "0.8" and "1", the standard maximal-sequence code is "1 −1 1 1 1 −1 −1" and the standard maximal-sequence code and maximal-sequence codes "−1 1 −1 1 1 1 −1", "−1 −1 1 1 −1 1 1 1", and "1 −1 −1 1 −1 1 1" which are sequentially phase shifted with 1 bit are supplied to multipliers 111, 112, 113 and 114 respectively.

Sequence codes of "0 0 0 0 0 0 0", "−0.5 0.5 −0.5 0.5 0.5 −0.5", "−0.8 −0.8 0.8 −0.8 0.8 0.8 0.8" and "1 −1 −1 1 −1 1 1" are output from the multipliers 111, 112, 113 and 114 respectively. The convoluted sequence code of "−0.3 −1.3 −0.7 0.7 0.3 2.3 1.3" is sent out from an adder 100 by adding the sequence codes by the adder 100.

Figure 10:
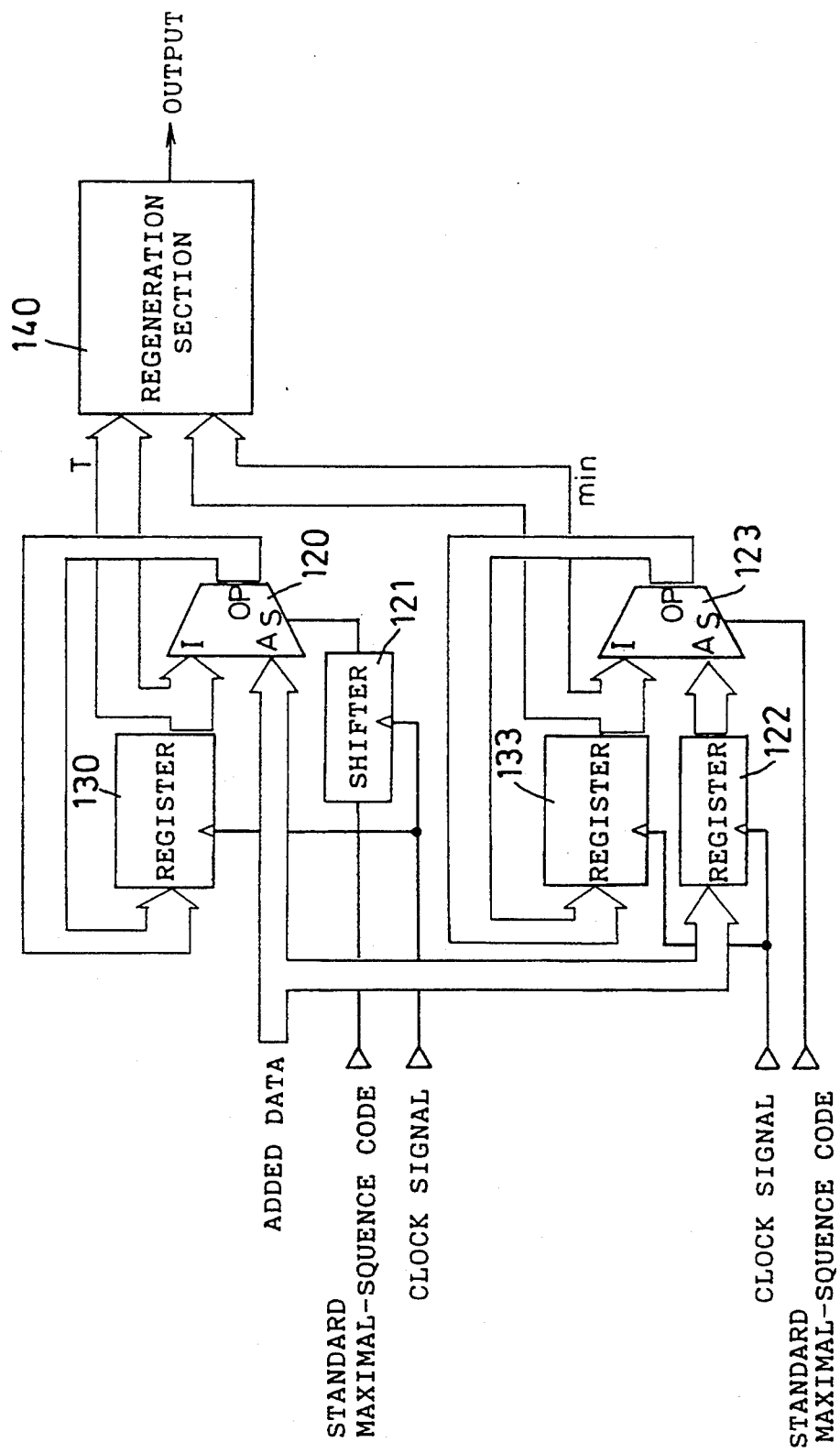
FIG. 10 is a block diagram showing a data receiving side of a data transmission apparatus of another embodiment according to the present invention.

FIG. 10 is a block diagram showing a data receiving side of the data transmission apparatus of the embodiment according to the present invention. In the data receiving side, the convoluted data is supplied to one input terminal A of an operational amplifier 120 while the contents of a register 130 is supplied to another input terminal I thereof, the operational amplifier 120 being supplied a maximal-sequence code as a control data which is phase shifted with a phase shifting quantity corresponding to a channel to be regenerated. An operation result output from an output terminal OP of the operational amplifier 120 is feedbacked to the register 130. The content of the register 130, or the cross-correlation value T, is supplied to a regeneration section 140. The data receiving side further includes a shifter 121 for phase shifting the standard maximal-sequence code and the maximal-sequence code output from the shifter 121 is supplied to the operational amplifier 120 as the control data. In the data receiving side also, the added data is phase shifted with 1 bit and is supplied to one input terminal A of an operational amplifier 123 through a register 122, while the content of a register 133 is supplied to another input terminal I thereof, the operational amplifier 123 being supplied the standard maximal-sequence code as a control data. An operation result output from an output terminal OP of the operational amplifier 123 is feedbacked to the register 133. The content of the register 133, or the minimum cross-correlation value min is supplied to the regeneration section 140. The regeneration section 140 receives the cross-correlation value T and the minimum cross-correlation value min and performs an operation of $2^{-3}$ (T-min). When a standard data is 1, it is sufficient to perform an operation of $2^{-3}$ (max-T) because a maximum cross-correlation value max substituting the minimum cross-correlation value min is obtained. The operational amplifiers 120 and 123 are established to output operation results in a form of the complement of 2. The operational amplifiers 120 and 123 are also established to perform an operation of OP=I+A when the maximal-sequence code is "1" and to perform an operation of OP=I−A when the maximal-sequence code is "0". The registers 130 and 133 are established to output the uppermost digit. They are cleared of their contents at every supplying of a number of clock signals, the number being equal to the number of bits of the maximal-sequence code.

When the standard input data is 0 and the convoluted data of "−0.3 −1.3 −0.7 0.7 0.3 2.3 1.3" is supplied to the input terminal A of the operational amplifier 120, and an 1 bit phase shifted maximal-sequence code of "0 1 0 1 1 1 0" is supplied to the operational amplifier 120 as the control data for example. The following operations are sequentially performed.

0−(−0.3)=0.3
0.3+(−1.3)=−1.0
−1.0−(−0.7)=−0.3
−0.3+0.7=0.4
0.4+0.3=0.7
0.7+2.3=3.0
3.0−1.3=1.7

Finally the obtained value 1.7 is supplied to the regeneration section 140 as the cross-correlation value T.

In the operational amplifier 123 which is supplied the standard maximal-sequence code of "1 0 1 1 1 0 0" as the control data, the following operations are sequentially performed.

0+(−0.3)=−0.3
−0.3−(−1.3)=1.0
1.0+(−0.7)=0.3
0.3+0.7=1.0
1.0+0.3=1.3
1.3−2.3=−1.0
−1.0−1.3=−2.3

Then, the obtained value −2.3 is supplied to the regeneration section 140 as the minimum cross-correlation value min.

Afterwards, in the regeneration section 140, the operation of $2^{-3}\{1.7-(-2.3)\}$ is performed, and as a result, the original intermediate value of input data B22=0.5 is regenerated. The other intermediate values of input data B23 and B24 are also regenerated by performing similar operations based on maximal-sequence codes which are phase shifted with 2 bits and 3 bits respectively.

Fourth Embodiment

Figure 11:
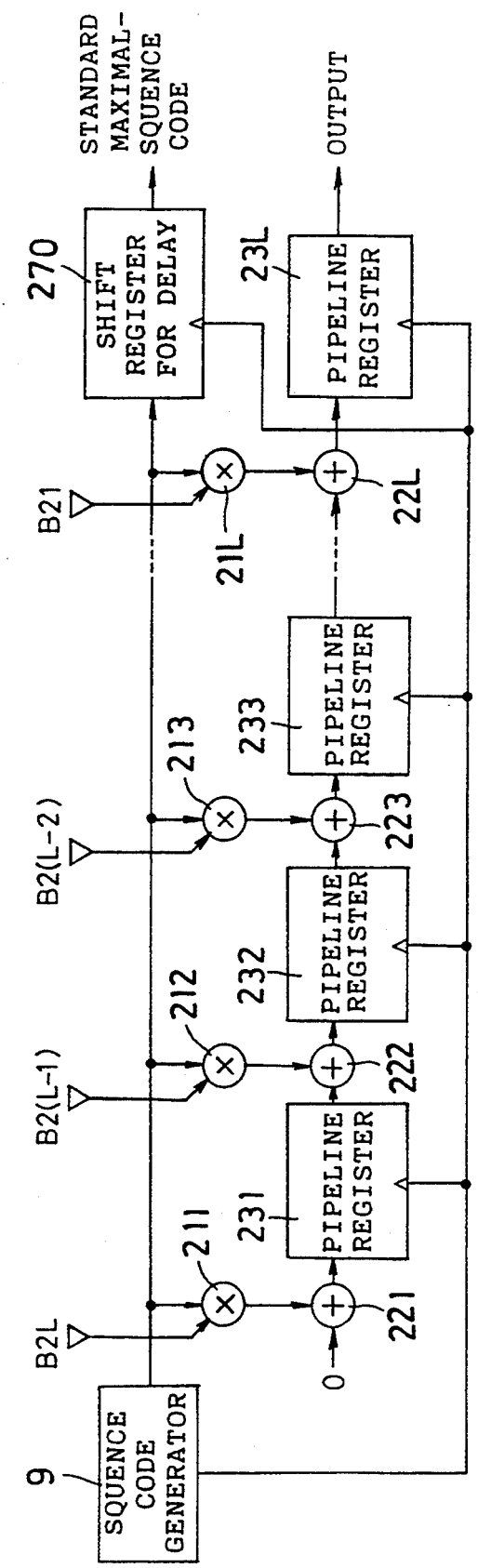
FIG. 11 is a block diagram showing a data sending out side of a data transmission apparatus of still another embodiment according to the present invention.

FIG. 11 is a block diagram showing a data sending side of a data transmission apparatus of still another embodiment according to the present invention.

In the data sending side, a standard input data B21 having a known level and multiple value input data B22, B23 .... B2L for (L−1) channels which are independent from one another are supplied to pipeline registers 231, 232 ... 23L which function as phase shift means through multipliers 211, 212 ... 21L, which function as modulation means, and adders 221, 222 ... 22L which function as convolution means, respectively. The multipliers 211, 212 ... 21L are supplied a standard maximal-sequence code which is output from a sequence code generator 9. The content of each pipeline register is supplied to an adder of the next stage so as to perform addition operations with phase shifted conditions. The content of the pipeline register 23L of the last stage is output to a data bus. The data sending out side further includes L-staged shift registers 270 for delay for outputting a standard maximal-sequence code.

In this embodiment, the maximal-sequence code is modulated based on all input data B21, B22 ... B2L. Each modulated sequence code is supplied to an adder of the next stage through pipeline registers 231, 232 ... 23L, respectively. Each sequence code is added with 1 bit phase shifted timing of the maximal-sequence code so as to obtain a convoluted data, which is similar to the convoluted data obtained by the embodiment shown in FIG. 9.

This embodiment eliminates the limit of the number of binary logical input data because this embodiment can deal with an increased number of binary logical input data by increasing the number of stages of the pipelined arrangement in comparison with the embodiment shown in FIG. 9, being able to deal with a maximum about 100 binary logical input data by one adder 100.

Fifth Embodiment

Figure 12:
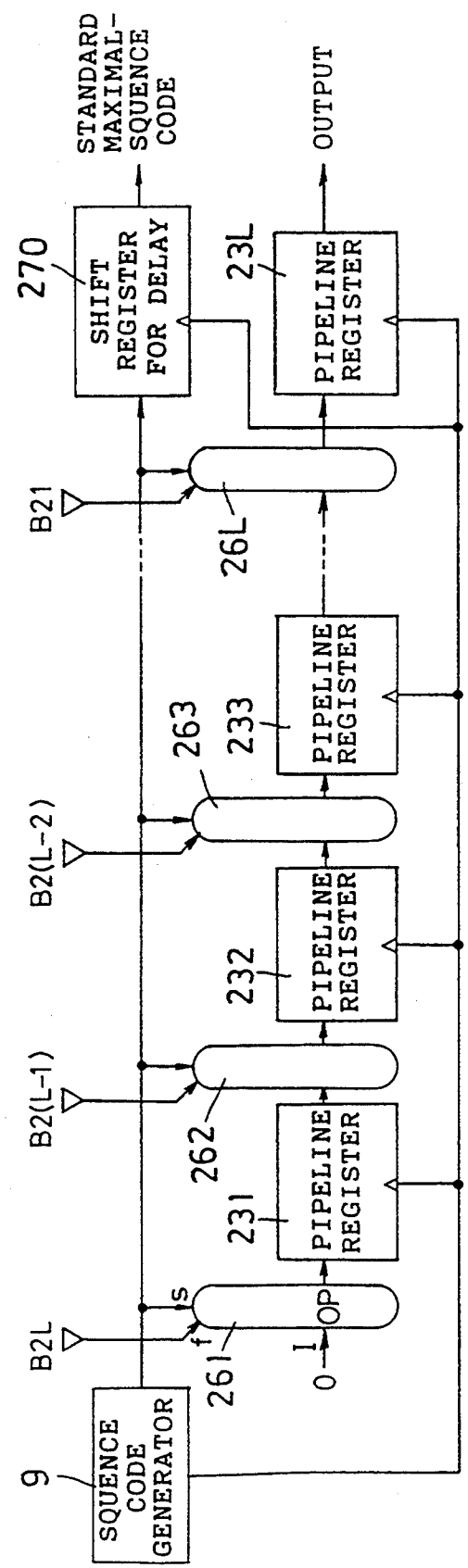
FIG. 12 is a block diagram showing a data sending side of a data transmission apparatus of yet another embodiment according to the present invention.

FIG. 12 is a block diagram showing a data sending side of a data transmission apparatus of yet another embodiment according to the present invention.

This embodiment differs from the embodiment shown in FIG. 11 in that L number of operational amplifiers 261, 262 ... 26L which unite modulation means and convolution means are provided instead of multipliers 211, 212 ... 21L and adders 221, 222 ... 22L. Each operational amplifier is supplied the standard m-serial data as a control data S, is supplied the contents of a pipeline register in one input terminal I and is supplied an input data of each channel in another input terminal f. Each operational amplifier is established to perform an operation of I+f when the control data S is "1" and to perform an operation of I−F when the control data S is "0", then to output the operation result from an output terminal OP.

In this embodiment, the operational amplifiers perform operations which are similar to the operations of the multipliers and the adders, so as to obtain an convoluted data which is similar to the convoluted data obtained by the embodiment shown in FIG. 11 and to send the convoluted data to the data bus.

Specific Example 2

Figure 13:
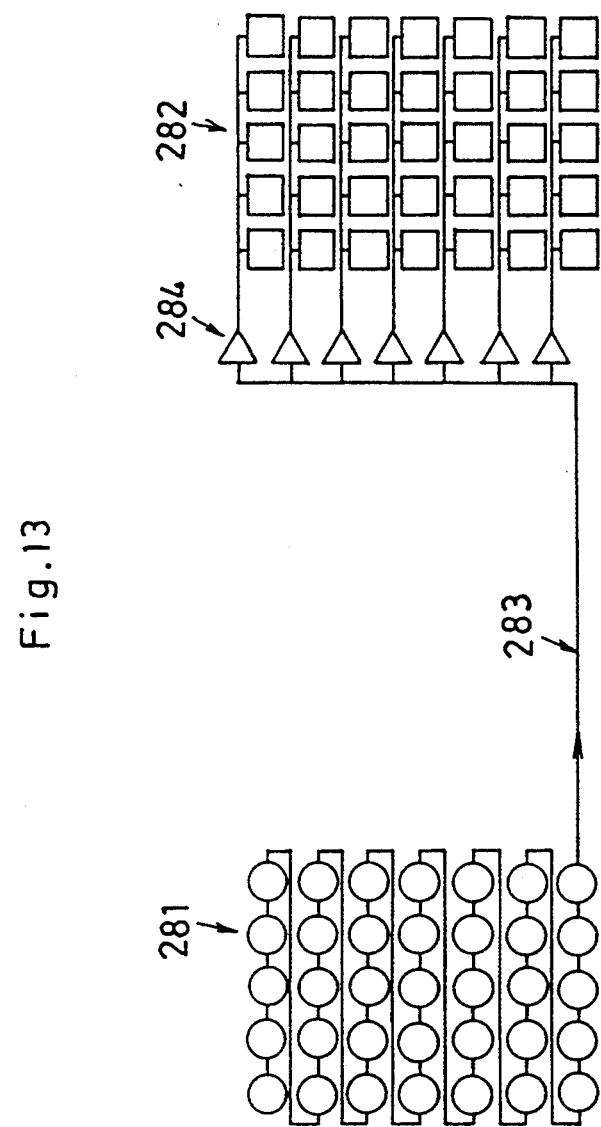
FIG. 13 is a schematic diagram showing a specific sample of an apparatus, for transmitting two dimensional data.

FIG. 13 is a schematic diagram showing a specific sample of an apparatus for transmitting two dimensional data. In this example, 35 input units 281, each of which includes pipeline registers and operational amplifiers, are connected in pipeline form, and 35 regeneration units 282, each of which includes operational amplifiers, registers, a shifter and an regeneration section, are connected in parallel. The apparatus further includes a data bus 283 and buffers 284.

Figures 14A, 14B, 14C, 14D:
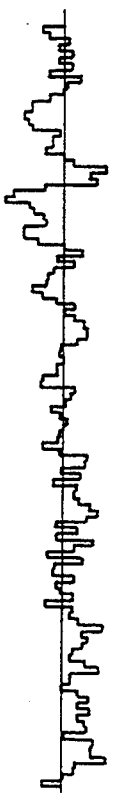
FIG. 14A, 14B, 14C, and 14D are a group of schematic diagram showing data transmission operation of the specific sample shown in FIG. 13.

In this embodiment, 5×7 input data which includes intermediate value data as shown in FIG. 14-A are supplied to the input units 281. Then, data are transferred using a maximal-sequence code having a 127 bit length as shown in FIG. 14-B (convoluted data are shown in FIG. 14-C). Thereafter, input data are regenerated by regeneration units 282, which are disposed in correspondence with the input units 281. As a result, regeneration of input data is performed as shown in FIG. 14-D. That is, 5×7 input data which include intermediate value data are regenerated accurately.

As is apparent from the foregoing, it is necessary to use the maximal-sequence code which is the same as the maximal-sequence code used for modulation, when data is regenerated, thereby keeping the secrecy of transmission data maintained securely. Also, the transmission data is held in distributed form in the whole extent of the maximal-sequence code. This means that data can be regenerated with fairly high accuracy, even when data is partially lost.

The data transmission methods and apparatus according to the present invention is not limited to the embodiments mentioned above. The data transmission methods and apparatus may perform modulation and demodulation using a pseudo noise having significant auto-correlation characteristics other than the maximal-sequence code, for example random numbers, a balowa-sequence code and the like. The data transmission methods and apparatus may be applied to various data transmission net works. Further, in the embodiments shown in FIGS. 2, 9 and 11, analog switches may be used instead of the multipliers. Furthermore, in the embodiments shown in FIGS. 2, 9 and 11, an arbitrary value within the range of 0 to 1 may be used as a standard value.

The terms and expressions which have been employed are used as terms of description and not of limitations, and there is no intention, in the use of such terms and expressions of excluding equivalents of the features shown and described, or portions thereof, it being recognized that various modifications are possible within the scope of the invention as claimed.

Sixth Embodiment

FIG. 15 is a block diagram showing a neuron device as an embodiment of a data processing apparatus according to the present invention. The neuron device includes a pair of cross-correlators 411 and 412 to which a convoluted sequence code expressed by an equation of $$S(t) = \sum_{j=1}^{L} xj \cdot m(t + j\Delta T)$$

is supplied, an offset correction section 413 which receives cross-correlation values output from the cross-correlators 411 and 412 and performs offset correction, and a threshold processing section 414 which receives data applied offset correction and applied threshold processing. One cross-correlator 411 is supplied a neuron code expressed by an equation of $$C(t) = \sum_{j=1}^{L} wj \cdot m(t + j\Delta T)$$

which is previously obtained based on a known weighting factor and a maximal-sequence code, while the other cross-correlator 412 is supplied a standard maximal-sequence code. The offset correction section 413 first obtains a difference between a value which is obtained by taking all weighting factors into consideration to the cross-correlation value output from the cross-correlator 412 and the cross-correlation value output from the cross-correlator 411, then divides the difference by a difference between a cross-correlation value which corresponds to a "1" level and a cross-correlation value which corresponds to a "0" level. The threshold processing section 414 converts the offset corrected data to an intermediate value within the range of 0 to 1 by a sigmoid function of $Y=\{1+e^{(-X+\theta)}\}-1$. The neuron device is sufficient to include a shift register and the like for storing a calculated neuron code because the neuron code C(t) can previously be calculated using weighting factors which are obtained by studying enough with another neural network. The total sum $$\sum_{j=1}^{L} wj$$

of weighting factors and an inverse number $2^{-n}=1/(\max-\min)$ of the difference between the cross-correlations which correspond to a "1" level and a "0" level respectively can also previously be determined. The inverse number $2^{-n}$ can easily be obtained using wire shifting.

Operations of the neuron device having the arrangement mentioned above are as follows.

The convoluted data S(t), which is supplied through a data bus, and the neuron code C(t) are supplied to the cross-correlator 411. Then, a cross-correlation value $$\beta(t) = \sum_{k=1}^{2^n-1} S(t + k\Delta T)C(t + k\Delta T)$$

is obtained. The convoluted data S(t) and the standard maximal-sequence code are supplied to the cross-correlator 412. Then, the cross-correlation value min corresponding to a "0" value is obtained. The cross-correlation value $\beta(t)$ is equal to the value which is obtained by adding cross-correlation values for plural input data with taking corresponding weighting factor into consideration.

When the cross-correlation value $\beta(t)$ and the cross-correlation value min are supplied to the offset correction section 413, the difference between the cross-correlation value $\beta(T)$ and the cross-correlation value taking the weighting factor into consideration, then an output value $$X = 2^{-n}\left(\beta(t) - \min \sum_{j=1}^{L} wj\right)$$

is obtained by multiplying $2^{-n}$. When the output data X is supplied to the threshold processing section 414, the output data is converted to the intermediate value within the range of 0 to 1 by a sigmoid function of $Y=\{1+e^{(-X+\theta)}\}-1$ and the intermediate value is output therefrom.

As is apparent from the foregoing, arrangement of the neuron device as a whole can be greatly simplified because it is sufficient that the convoluted data is received through one data bus and cross-correlation values are obtained by only two cross-correlators 411 and 412 even when the number of input data is increased. That is, the physical limit of a number of input data when exclusive electric lines are provided for every input data channel can be eliminated, and lowering of the processing efficiency when a common bus is used in a time sharing manner can also be eliminated. As a result, a neuron device with a simple arrangement which receives the desired number of input data and has a high processing efficiency can be obtained.

Seventh Embodiment

Figure 16:
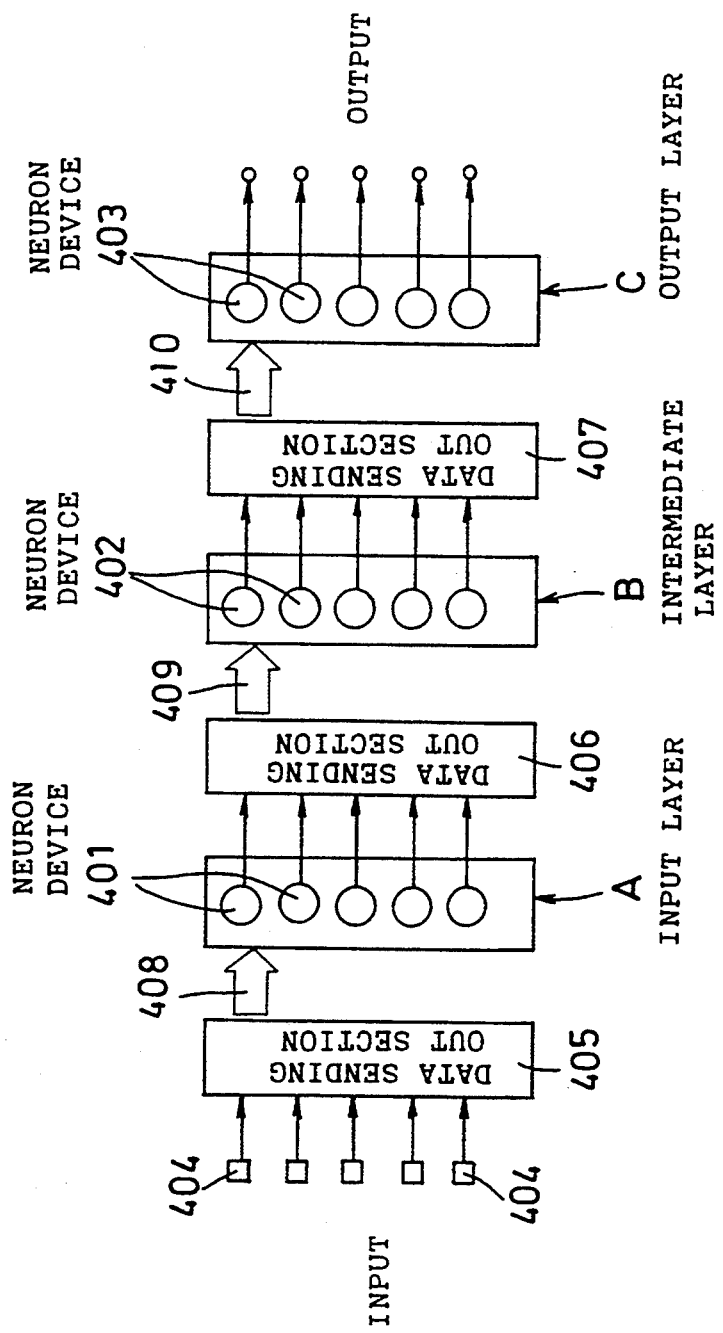
FIG. 16 is a schematic block diagram of an embodiment of a neural network according to the present invention.

FIG. 16 is a schematic block diagram of an embodiment of a neural network according to the present invention. The neural network is shown as a pattern association type neural network in which an input layer A, an intermediate layer B and an output layer C is included.

The input layer A includes l-number neuron devices 401, the intermediate layer B includes m-number neuron devices 402 and the output layer C includes p-number neuron devices 403. The neural network further includes a data sending section 405 for modulating maximal-sequence codes based on output data from q-number sensors 404, for convoluting the modulated data and for supplying the convoluted data to each neuron device 401 of the input layer A, a data sending section 406 for modulating maximal-sequence codes based on output data from the l-number neuron devices 401 of the input layer A, for convoluting the modulated data and for supplying the convoluted data to each neuron device 402 of the intermediate layer B and a data sending section 407 for modulating maximal-sequence codes based on output data from the m-number neuron devices 402 of the intermediate layer B, for convoluting the modulated data and for supplying the convoluted data to each neuron device 403 of the output layer B. A neuron device shown in FIG. 15 is used as each neuron device 401, 402 and 403.

Operations of the neural network having the arrangement mentioned above are as follows.

Image data, sound data and the like are output from the q-number sensors 404, and maximal-sequence codes phase shifted with individual phase shifting quantities are modulated based on each output data by the data sending section 405. Then, all modulated maximal-sequence codes are convoluted and supplied to all neuron devices 401 of the input layer A through the data bus 408. All neuron devices 401 of the input layer A generate and output values within the range of 0 to 1 based on a previously determined neuron code C(t) and the total sum $$\sum_{j=1}^{l-1} wj$$

of weighting factors. Maximal-sequence codes phase shifted with individual phase shifting quantities are modulated based on each output data output from the l-number neuron devices 401 by the data sending section 406, then all modulated maximal-sequence codes are convoluted and supplied to all neuron devices 402 of the intermediate layer B through the data bus 409. All neuron devices 402 of the intermediate layer B generate and output values within the range of 0 to 1 based on a previously determined neuron code C(t) and the total sum $$\sum_{j=1}^{m-1} wj$$

of weighting factors. Maximal-sequence codes phase shifted with individual phase shifting quantities are modulated based on each output data output from the m-number neuron devices 402 by the data sending section 407. All modulated maximal-sequence codes are then convoluted and supplied to all neuron devices 403 of the output layer C through the data bus 410. All neuron devices 403 of the output layer C generate and output values within the range of 0 to 1 based on a previously determined neuron code C(t) and the total sum $$\sum_{j=1}^{p-1} wj$$

of weighting factors. Finally, output data output from p-number neuron devices 403 of the output layer C are seized as a result of pattern recognition, characteristics extraction and the like based on the image data, sound data and the like.

As is apparent from the foregoing, interconnection between corresponding layers is performed by only one data bus between sensors S, the input layer A, the intermediate layer B and the output layer C. As a result, the neural network as a whole is simplified its arrangement. Further, processing efficiency of the neural network is improved because a value equal to the added value of all input data can be obtained by only obtaining cross-correlation after data is simultaneously transmitted to all neuron devices other than data transmission in time shared manner.

Figure 17:
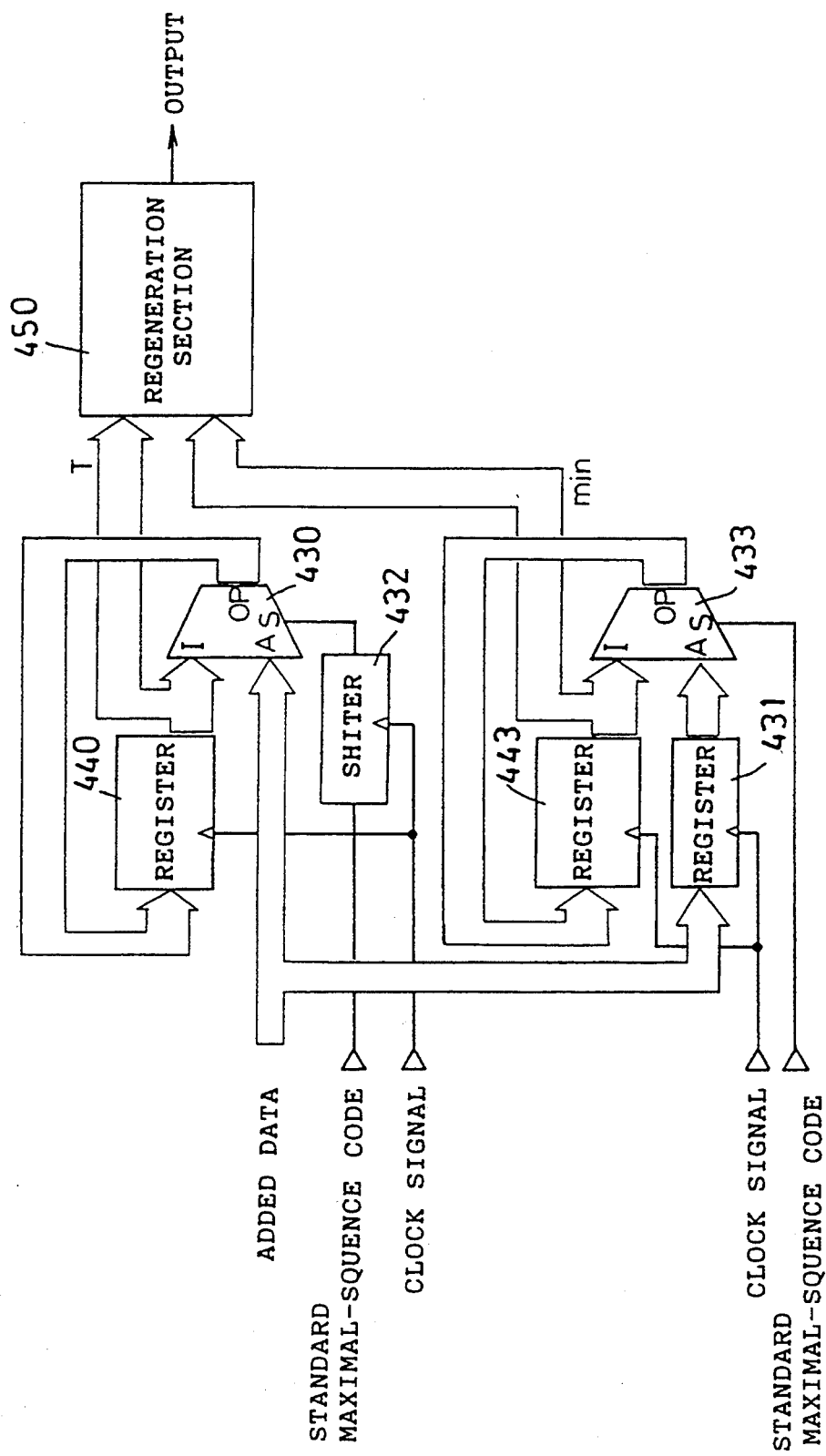
FIG. 17 is a block diagram showing a sample of a cross-correlator which is incorporated in the neuron device.

FIG. 17 is a block diagram showing a sample of a cross-correlator which is incorporated in the neuron device. In the cross-correlator, the convoluted data is supplied to one input terminal A of an operational amplifier 430 while the content of a register 440 is supplied to another input terminal I thereof, the operational amplifier 430 being supplied a maximal-sequence code as a control data which is phase shifted with a phase shifting quantity corresponding to a channel to be regenerated. An operation result output from an output terminal OP of the operational amplifier 430 is feedbacked to the register 440. The content of the register 440, or the cross-correlation value T is supplied to a regeneration section 450. The cross-correlator further includes a shifter 432 for phase shifting the standard maximal-sequence code. The maximal sequence code output from the shifter 432 is supplied to the operational amplifier 430 as the control data. In the cross-correlator also, the convoluted data is phase shifted with 1 bit and is supplied to one input terminal A of an operational amplifier 433 through a register 431 while the content of a register 443 is supplied to another input terminal I thereof, the operational amplifier 433 being supplied the standard maximal-sequence code as a control data. An operation result output from an output terminal OP of the operational amplifier 433 is feedbacked to the register 443. The content of the register 443, or the minimum cross-correlation value min is supplied to the regeneration section 450. The regeneration section 450 receives the cross-correlation value T and the minimum cross-correlation value min and performs an operation of $2^{-3}$(T-min). When a standard data is 1, it is sufficient to perform an operation of $2^{-3}$(max-T) because a maximum cross-correlation value max substituting for the minimum cross-correlation value min is obtained. The operational amplifiers 430 and 433 are established to output operation results in the form of complement of 2. The operational amplifiers 430 and 433 are also established to perform an operation of OP=I+A when the maximal-sequence code is "1" and to perform an operation of OP=I−A when the maximal-sequence code is "0". The registers 440 and 443 are established to output the uppermost digit and are cleared of their contents at every supplying of a number of clock signals, the number being equal to the number of bits of the maximal-sequence code.

When the standard input data is 0 and the convoluted data of "−0.3 −1.3 -0.7 0.7 0.3 2.3 1.3" which is the same as the convoluted data in the third embodiment is supplied to the input terminal A of the operational amplifier 430 and an 1 bit phase shifted maximal-sequence code of "0 10 1 1 1 0" is supplied to the operational amplifier 430 as the control data for example, the following operations are sequentially performed.

0−(−0.3)=0.3
0.3+(−1.3)=−1.0
−1.0−(−0.7)=−0.3
−0.3+0.7=0.4
0.4+0.3=0.7
0.7+2.3=3.0
3.0−1.3=1.7

Then, the obtained value 1.7 is supplied to the regeneration section 450 as the cross-correlation value T.

In the operational amplifier 443 which is supplied the standard maximal-sequence code of "1 0 1 1 1 0 0" as the control data, the following operations are sequentially performed.

0+(0.3)=−0.3
−0.3−(−1.3)=1.0
1.0+(−0.7)=0.3
0.3+0.7=1.0
1.0+0.3=1.3
1.3−2.3=−1.0
−1.0−1.3=−2.3

Then, the obtained value −2.3 is supplied to the regeneration section 450 as the minimum cross-correlation value min.

Afterwards, in the regeneration section 450, the operation of $2^{-3}${1.7−(−2.3)} is performed, and as a result, the original intermediate value input data Z2=0.5 is regenerated.

The above description is made in the case where an intermediate data of a corresponding channel is regenerated based on a maximal-sequence code phase shifted with predetermined phase shifting quantity, but the cross-correlator may regenerate intermediate data of all channels by using a neuron code substituting the maximal-sequence codes, and then may obtain a value which is the same as the added value of the regenerated value.

Figure 18:
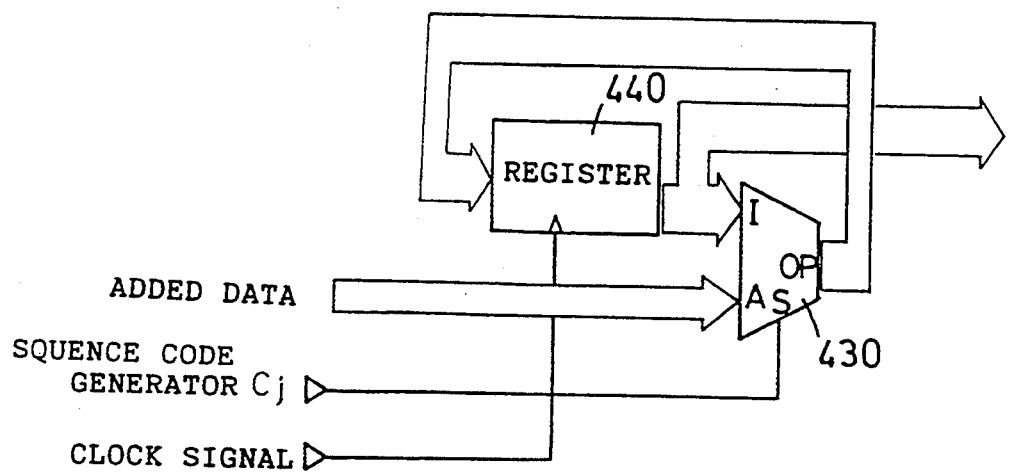
FIG. 18 is a block diagram showing another sample of a cross-correlator which is incorporated in the neuron device.
Figure 19:
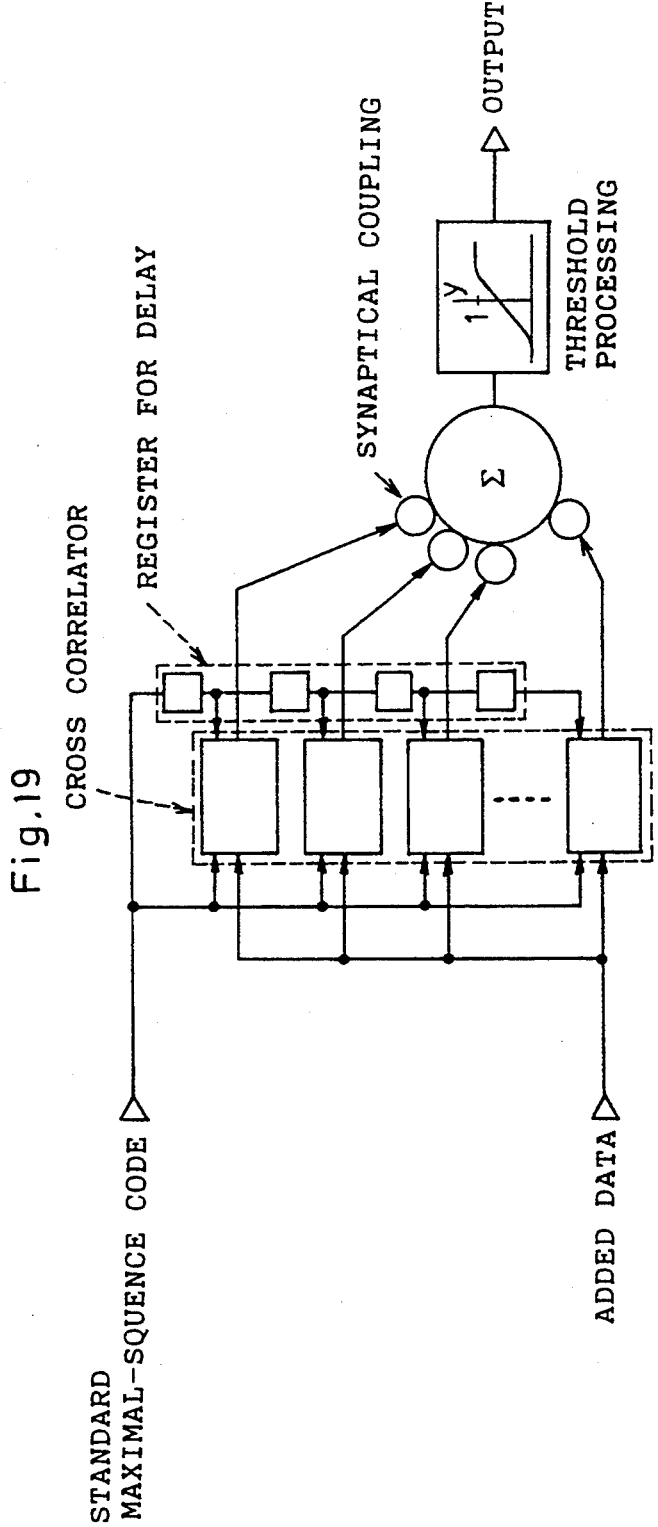
FIG. 19 is a block diagram showing a neuron device as previously envisioned by the inventor.
Figure 20:
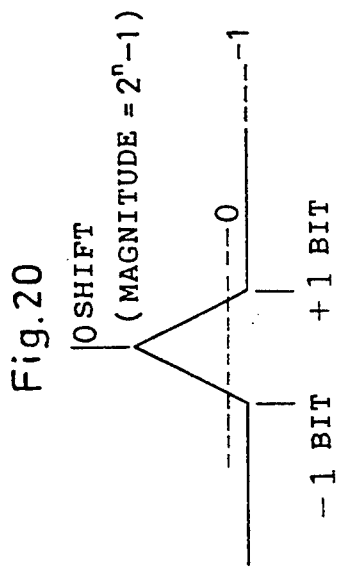
FIG. 20 is a diagram for explain widely known characteristics of a maximal-sequence code.
Figure 21:
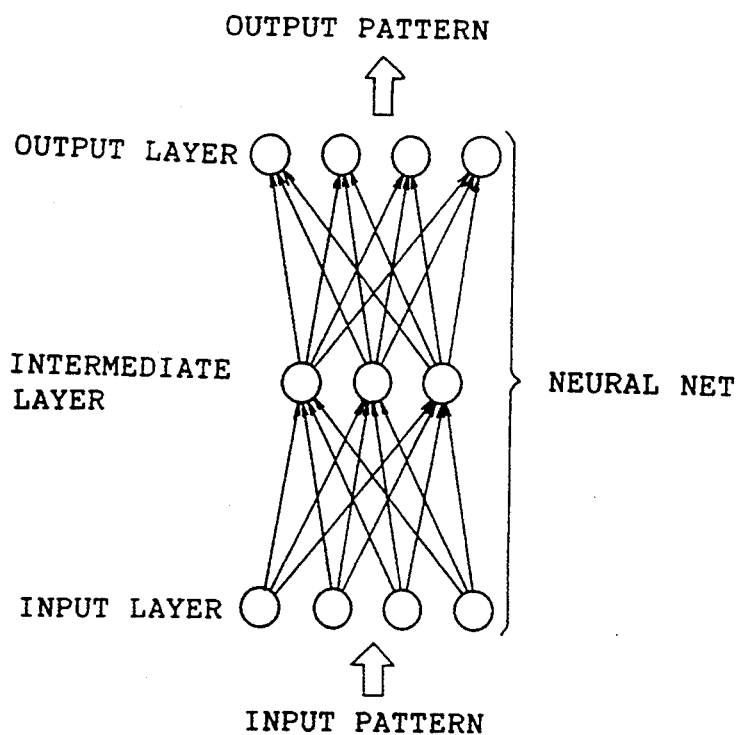
FIGS. 21A and 21B are diagrams schematically showing a neural network.
Figure 21B:
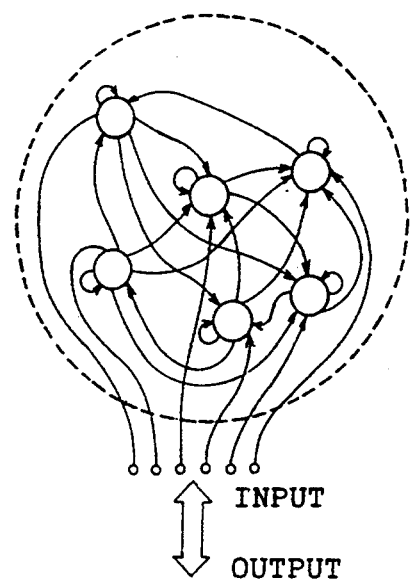
Figure 22:
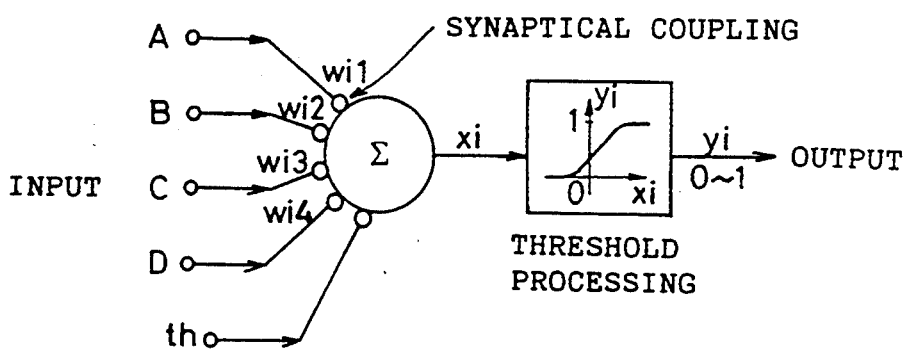
FIG. 22 is a diagram typically showing a nerve cell.

FIG. 18 is a block diagram showing another sample of a cross-correlator which is incorporated in the neuron device.

This cross-correlator differs from the cross-correlator shown in FIG. 17 in that the operational amplifier 433 and registers 431 and 443 for obtaining the minimum cross-correlation value min and the regeneration section 450 are omitted and that a sequence code Cj which is obtained by multiplying weighting factors with a difference between a maximal-sequence code corresponding to regeneration data and a maximal-sequence code corresponding to the standard value is supplied to the operational amplifier 430.

The arrangement of the neuron device can be further simplified by employing the cross-correlator having the arrangement mentioned above.

Operations of the cross-correlator having the arrangement shown in FIG. 18 are as follows.

When the standard maximal-sequence code is "$-1\ 1\ 1\ 1\ -1\ -1\ 1$" and a standard input data Z1 and multiple value data Z2, Z3 and Z4 output from the neuron devices of a prior layer are "0", "0.5", "0.8" and "1", the convoluted data "2.3 0.3 $-1.3$ $-0.3$ $-0.7$ 0.7 1.3" is sent out. As to regeneration data R2, R3 and R4 to be regenerated based on the convoluted data and maximal-sequence codes m1j, m2j, m3j and m4j (where $j = 1, 2, \ldots 7$) corresponding to a standard value R1 and the data R2, R3 and R4 respectively, the data R2, R3 and R4 are unknown, the standard value R1 is 1 and the maximal-sequence codes m1j, m2j, m3j and m4j are represented as follows.

m1j = "$-1\ 1\ 1\ -1\ -1\ 1$"
m2j = "$1\ 1\ 1\ -1\ -1\ 1\ -1$"
m3j = "$1\ 1\ -1\ -1\ 1\ -1\ 1$"
m4j = "$1\ -1\ -1\ 1\ -1\ 1\ 1$"

The unknown regeneration data Ri is represented by the equation of $$Ri = 2^{-3}\left(\sum_{j=1}^{7} Sj \cdot mij - \sum_{j=1}^{7} Sj \cdot m1j\right)$$

$$= (1/8) \sum_{j=1}^{7} Sj(mij - m1j)$$

The code m2j-m1j is "2 0 0 $-2$ 0 2 $-2$", the code m3j-m1j is "2 0 $-2$ $-2$ 2 0 0" and the code m4j-m1j is "2 $-2$ $-2$ 0 0 2 0" and the code Sj(m2j-m1j) is "4.6 0.0 0.0 0.6 0.0 1.4 $-2.6$", the code S3(m3j-m1j) is "4.6 0.0 2.6 0.6 $-1.4$ 0.0 0.0" and the code Sj(m4j-m1j) is "4.6 $-0.6$ 2.6 0.0 0.0 1.4 0.0". Then the regeneration data R2, R3 and R4 are obtained by the following equations.

R2 = (4.6+0.6+1.4−2.6)/8 = 0.5
R3 = (4.6+2.6+0.6−1.4)/8 = 0.8
R4 = (4.6−0.6+2.6+1.4)/8 = 1.0

As a result, the regeneration data R2, R3 and R4 coincide with the multiple value data Z2, Z3 and Z4.

The sum $\delta$ of data which is obtained by multiplying weighting factors to the multiple value input data Z2, Z3 and Z4. The sum $\delta$ can be obtained by obtaining cross-correlation of $$\delta = \sum_{j=1}^{7} Sj \cdot Cj$$

by previously obtaining the sequence code of $$Cj = (1/2^n) \sum_{i=2}^{4} \{wi(mij - m1j)\}$$

because the sum $\delta$ is generally represented by the following equation.

$$\delta = \sum_{i=2}^{4} wi \cdot Ri$$

$$= \sum_{i=2}^{4} \left[(1/2^n)\left(\sum_{j=1}^{7} Sj(mij - m1j)\right)wi\right]$$

$$= (1/2^n) \sum_{i=2}^{4} \sum_{j=1}^{7} \{Sj(mij - m1j)\}wi$$

$$= (1/2^n) \sum_{j=1}^{7}\left[Sj \sum_{i=2}^{4} \{wi(mij - m1j)\}\right],$$

where the weighting factor w1 is always 1 for being in correspondence with the channel of the standard data.

When it is supposed in the foregoing example that the weighting factors w2, w3 and w4 are 1.0, 2.5 and $-1.5$ respectively, the code w1(m1j-m1j) is "0 0 0 0 0 0 0", the code w2(m2j-m1j) is "2 0 0 $-2$ 0 2 $-2$", the code w3(m3j-m1j) is "5 0 $-5$ $-5$ 5 0 0" and the code w4(m4j-m1j) is "$-3$ 3 3 0 0 $-3$ 0" and the sequence code Cj=($\frac{1}{8}$)$\Sigma$wi(mij-m1j) is "0.5 0.375 $-0.25$ $-0.875$ 0.625 $-0.125$ $-0.25$". Consequently, the code SjCj is "1.15 0.1125 0.325 0.2625 $-0.4375$ $-0.0875$ $-0.325$" and the sum $\delta$ is 1 calculated by the equation of $$\delta = \sum_{j=1}^{7} SjCj.$$

It is recognized that the sum $\delta$ calculated by the foregoing processings coincide with the sum $\delta$ calculated by the equation of $\delta = w2R2 + w3R3 + w4R4$.

As is apparent from the foregoing, the sum $\delta$, taking the weighting factors wj into consideration, can easily be obtained without calculating the minimum cross-correlation value min by previously obtaining and supplying the sequence code $$Cj = (1/2^n) \sum_{i=2}^{4} \{wi(mij - m1j)\}$$

to the operational amplifier 430.

Figure 3:
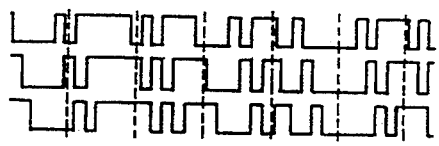
FIG. 3 is a diagram showing a sample of maximal-sequence codes for modulation.

The data processing apparatus and the neural network according to the present invention is not limited to the embodiments mentioned above. The data processing apparatus and the neural network may perform modulation and demodulation using a pseudo noise having significant auto-correlation characteristics other than the maximal-sequence code, for example random numbers, a balowa-sequence code and the like. Further, in the embodiments shown in FIGS. 3 and 7, analog switches may be used instead of the multipliers 111, 112 ... 11L, 211, 212 ... 21L. Furthermore, in the embodiments shown in FIGS. 3 and 7, an arbitrary value within the range of 0 to 1 may be used as a standard value. Still further, one cross-correlator for standard which is common to all neuron devices of each layer may be employed instead of providing cross-correlators for standards for every neuron device.

The terms and expressions which have been employed are used as terms of description and not of limitations, and there is no intention, in the use of such terms and expressions of excluding equivalents of the features shown and described, or portions thereof, it being recognized that various modifications are possible within the scope of the invention as claimed.

What is claimed is:

1. A modulation method comprising the steps of:
providing a certain pseudo noise which has significant auto-correlation characteristics to obtain a provided pseudo noise;
phase shifting the provided pseudo noise by a first quantity to obtain a first pseudo noise for modulation;
phase shifting the provided pseudo noise by a second quantity, which is different from the first quantity, to obtain a second pseudo noise for modulation;
modulating the first pseudo noise for modulation based on first data for transmission to obtain a first modulated pseudo noise corresponding to the first data for transmission;
modulation the second pseudo noise for modulation based on second data for transmission to obtain a second modulated pseudo noise corresponding to the second data for transmission; and
convoluting the first and second modulated pseudo noises to obtain data for transmission.

2. A modulation method comprising the steps of;
modulating a certain pseudo noise based on first data for transmission;
modulating the certain pseudo noise based on second data for transmission to provide plural modulated pseudo noises, the certain pseudo noise having significant auto-correlation characteristics; and
phase shifting each modulated pseudo noise by a different quantity to obtain a corresponding plurality of phase shifted, modulated pseudo noises; and
sending out each phase shifted modulated pseudo noise as transmission data which is equivalent to a convolution of the modulated pseudo noises.

3. A modulation method comprising the steps of;
providing a certain pseudo noise which has significant auto-correlation characteristics;
phase shifting the certain pseudo noise which has significant auto-correlation characteristics by a first phase shift quantity to obtain a first pseudo noise for modulation;
phase shifting the certain pseudo noise by a second quantity, which is different from the first quantity, to obtain a second pseudo noise for modulation;
modulating the first pseudo noise for modulation based on first data for transmission to obtain a first modulated pseudo noise corresponding to the first data for transmission; and
modulating the second pseudo noise for modulation based on second data for transmission to obtain a second modulated pseudo noise corresponding to the second data for transmission; and
convoluting the modulated pseudo noises to obtain convoluted transmission data which includes data based on predetermined standard data.

4. A modulation method comprising the steps of;
modulating a certain pseudo noise based on first data for transmission;
modulating the certain pseudo noise based on second data for transmission to provide plural modulated pseudo noises, the certain pseudo noise having significant auto-correlation characteristics; and
phase shifting each modulated pseudo noise, based on predetermined standard data, by a different quantity to obtain phase shifted modulated pseudo noises; and
sending out each phase shifted modulated pseudo noise as transmission data in the form of addition data obtained from a convolution of the phase shifted modulated pseudo noises.

5. A modulation method as set forth in any one of claims 1–4, wherein the pseudo noise is a maximal-sequence code which has a code length longer than a total length of the plural data.

6. A modulation method as set forth in any one of claims 3 and 4, wherein the standard data unit have a value of "0" or "1".

7. A modulation method as set forth in claim 1, further comprising the step of:
phase shifting the certain pseudo noise by an n-th quantity where $n = 3, 4, 5, \ldots$, each quantity $n = 3, 4, 5, \ldots$, being different from the first to $(n-1)$-th quantities, to obtain an n-th pseudo noise for modulation; and
modulating the n-th pseudo noise for modulation based on n-th data for transmission to obtain an n-th modulated pseudo noise corresponding to the n-th data for transmission; and
wherein the convoluting step convolutes the first to n-th modulated pseudo noises to obtain data for transmission.

8. A demodulation method comprising the steps of;
receiving transmission data which has been obtained by respectively modulating plural pseudo noises for modulation with a corresponding plurality of transmission data, each of the plural pseudo noises for modulation being the same and having significant auto-correlation characteristics and each being phase shifted by a different quantity, the transmission data being a convolution of the modulated and phase shifted pseudo noises;
obtaining pseudo noises for demodulation by phase shifting a pseudo noise having significant auto-correlation characteristics by different quantities; and
demodulating received transmission data based on an obtained pseudo noise for demodulation which has been phase shifted by the same quantity as one of the pseudo noises for modulation.

9. A data transmission method comprising the steps of;
providing a certain pseudo noise which has significant auto-correlation characteristics;
obtaining plural pseudo noises for modulation by phase shifting the certain pseudo noise which has significant auto-correlation characteristics, each pseudo noise for modulation being phase shifted by a different quantity;
modulating each pseudo noise for modulation based on certain data for transmission to provide plural modulated pseudo noises;
convoluting the modulated pseudo noises to obtain transmission data;
sending out the transmission data;
receiving the transmission data;
obtaining pseudo noises for demodulation by phase shifting the certain pseudo noise which has significant auto-correlation characteristics by the same quantities that were used in said step of obtaining plural pseudo noises for modulation; and demodulating the received data based on the obtained pseudo noises for demodulation.

10. A data transmission method comprising the steps of:

modulating a certain pseudo noise based on first data for transmission;

modulating the certain pseudo noise based on second data for transmission, the certain pseudo noise having significant auto-correlation characteristics, said steps of modulating providing plural modulated pseudo noises;

phase shifting each modulated pseudo noise by a different quantity to obtain phase shifted modulated pseudo noises; and sending out each phase shifted modulated pseudo noise to obtain transmission data which is equivalent to convoluted modulated pseudo noises;

receiving the transmission data;

obtaining pseudo noises for demodulation, each pseudo noise for demodulation being obtained by phase shifting the certain pseudo noise by the same quantities as used in said step of phase shifting each modulated pseudo noise; and demodulating the received data based on the obtained pseudo noises for demodulation.

11. A data transmission method comprising the steps of:

providing a certain pseudo noise which has significant auto-correlation characteristics;

obtaining plural pseudo noises for modulation by phase shifting the certain pseudo noise which has significant auto-correlation characteristics, each pseudo noise for modulation being phase shifted by a different individual quantity;

modulating each pseudo noise for modulation based on associated data for transmission to obtain a modulated pseudo noise corresponding to each pseudo noise for modulation and the data for transmission;

convoluting the modulated pseudo noises to obtain transmission data which includes predetermined standard data;

sending out the transmission data;

receiving the transmission data;

obtaining pseudo noises for demodulation, each pseudo noise for demodulation being phase shifted by a quantity which is the same as a quantity by which one of the pseudo noises for modulation has been shifted whereby each pseudo noise for demodulation also is phase shifted by a different quantity; and demodulating the received transmission data based on the obtained pseudo noises for demodulation.

12. A data transmission method comprising the steps of:

modulating a certain pseudo noise based on at least plural groups of data for transmission to provide corresponding plural modulated pseudo noises, the certain pseudo noise having significant auto-correlation characteristics, the data including predetermined standard data of a standard data unit;

phase shifting each modulated pseudo noise by a different quantity to obtain corresponding phase shifted pseudo noises; and sending out each phase shifted pseudo noise to thereby send transmission data which is addition data obtained by convoluting the modulated pseudo noises;

receiving the transmission data;

obtaining pseudo noises for demodulation, each pseudo noise for demodulation being phase shifted by a quantity which is the same as a quantity by which one of the pseudo noises for modulation has been shifted whereby each pseudo noise for demodulation also is phase shifted by a different quantity; and demodulating the received data based on the obtained pseudo noises for demodulation.

13. A data transmission method as set forth in any one of claims 9-12, wherein the pseudo noise is a maximal-sequence code which has a code length longer than a total length of the plural data.

14. A data transmission method as set forth in any one of claims 11 and 12, wherein the standard data unit has a value of "0" or "1".

15. A modulation apparatus comprising;

pseudo noise generating means for generating plural pseudo noises for modulation from a selected quasi-noise that has significant auto-correlation characteristics by phase shifting the selected quasi-noise by a first quantity to obtain a first pseudo noise for modulation, and by shifting the selected quasi-noise by a second quantity, which is different from the first quantity, to obtain a second pseudo noise for modulation;

modulation means for modulating the first pseudo noise for modulation based on first data for transmission to obtain a first modulated pseudo noise, and for modulating the second pseudo noise for modulation based on second data for transmission to obtain a second modulated pseudo noise; and convolution means for convoluting the first and second modulated pseudo noises.

16. A modulation apparatus comprising;

modulation means for modulating a certain pseudo noise based on at least first data for transmission to obtain a first modulated pseudo noise, and second data for transmission to obtain a second modulated pseudo noise, the certain pseudo noise having significant auto-correlation characteristics;

phase shift means for phase shifting each modulated pseudo noise by a different quantity to obtain at least first and second phase shifted pseudo noises; and convolution means for convoluting the phase shifted pseudo noises.

17. A modulation apparatus comprising;

pseudo noise generating means for generating a plurality of pseudo noises for modulation based on a certain pseudo noise having significant auto-correlation characteristics, the generating means generating each of the plurality pseudo noises for modulation such that it is different from the other pseudo noises of the plurality by a different phase shift quantity;

modulation means for modulating each pseudo noise for modulation based on transmission data associated with said each pseudo noise for modulation to obtain a corresponding plurality of modulated pseudo noises; and convolution means for convoluting the corresponding plurality of modulated pseudo noises to obtain transmission data which has a predetermined standard data unit.

18. A modulation apparatus as set forth in claim 17, wherein said modulation means is provided by multipliers and said convolution means is an adder.

19. A modulation apparatus comprising:
modulation means for modulating a certain pseudo noise based on a plurality of identifiable data for transmission to obtain a corresponding plurality of modulated pseudo noises, the certain pseudo noise having significant auto-correlation characteristics;
phase shift means for phase shifting each modulated pseudo noise by a different quantity to obtain a corresponding plurality of phase shifted pseudo noises; and
convolution means for convoluting the modulated pseudo noises to obtain transmission data which has a predetermined standard data unit.

20. A modulation apparatus as set forth in claim 19, wherein said modulation means is provided by multipliers, said phase shift means is provided by pipeline registers and said convolution means is provided by pipeline registers and said convolution means is provided by adders.

21. A modulation apparatus as set forth in claim 19, wherein said modulation means is provided by operational amplifiers and said phase shift means and said convolution means are provided by pipeline registers which are alternatively connected with said operational amplifiers.

22. A modulation apparatus as set forth in any one of claims 15-21, wherein said pseudo noise is a maximal-sequence code which has a code length longer than a total length of the plural data.

23. A modulation apparatus as set forth in any one of claims 17-21, wherein said standard data unit have a value of "0" or "1".

24. A demodulation apparatus comprising;
receiving means for receiving a plurality of convoluted signals which are obtained by individually modulating a corresponding plurality of pseudo noises for modulation with a corresponding plurality of data to obtain a corresponding plurality of data modulated pseudo noises, the data modulated pseudo noises each having significant auto-correlation characteristics and being obtained by phase shifting a certain pseudo noise;
pseudo noise generating means for generating pseudo noises for demodulation that are phase shifted by the same phase shifting quantities as the data modulated pseudo noises; and
demodulation means for demodulating the received signals based on the generated pseudo noises for demodulation which have the same phase shifts as the pseudo noises for modulation.

25. A demodulation apparatus as set forth in claim 24, wherein said demodulation means includes a register, an operational amplifier for performing predetermined operations based on the content of said register, the received signals and a maximal-sequence code to obtain operation results and for supplying the operation results to said register, and an inverter for outputting regeneration data based on the uppermost digit of said register.

26. A demodulation apparatus comprising;
receiving means for receiving a plurality of data which are included in a corresponding plurality of modulated pseudo noises for modulation which each have significant auto-correlation characteristics and which each have been phase shifted by a different quantity and then convoluted;
pseudo noise generating means for generating pseudo noises for demodulation that are phase shifted by the same phase shifting quantities as the modulated pseudo noises for modulation; and
demodulation means for demodulating the received data based on the generated pseudo noises for demodulation to obtain demodulation data including standard data, the pseudo noises for demodulation having the same phase shift quantities as the modulated pseudo noises for modulation; and
restoration means for restoring data other than the standard data based on the demodulated standard data.

27. A demodulation apparatus as set forth in claim 26, wherein said demodulation means includes a first register, a shifter for shifting a standard maximal-sequence code with predetermined phase, a second register for holding the received data, and an operational amplifier for performing predetermined operations based on the content of said first register, the received data, a maximal-sequence code output from said shifter and the received data output from said second register to obtain operation results and for supplying the operation results to said first register.

28. A data transmission apparatus comprising;
pseudo noise generating means for generating plural different pseudo noises for modulation from a certain pseudo noise having significant auto-correlation characteristics by repetitively phase shifting the certain pseudo noise by different phase shift quantities;
modulation means for modulating the plural different pseudo noises for modulation based on plural data for transmission to obtain modulated pseudo noises; and
convolution means for convoluting the modulated and phase shifted pseudo noises to obtain convoluted data signals; and
demodulation means for demodulating the convoluted data signals based on pseudo noises which are the same as the pseudo noises for modulation.

29. A data transmission apparatus as set forth in claim 28, wherein said modulation means includes multipliers, said convolution means is an adder, and said demodulation means includes a register, an operational amplifier for performing predetermined operations based on the content of said register, the received data signal and a maximal-sequence code to obtain operation results and for supplying the operation results to said register, and an inverter for outputting regeneration data based on the uppermost digit of said register.

30. A data transmission apparatus comprising;
modulation means for modulating at least two pseudo noises based on at least two sets of data for transmission to provide at least two modulated pseudo noises, the at least two pseudo noises each having significant auto-correlation characteristics;
phase shift means for phase shifting each modulated pseudo noise by a different quantity to provide phase shifted modulated pseudo noise;
convolution means for convoluting the phase shifted and modulated pseudo noises to obtain convoluted data; and
demodulation means for demodulating the convoluted data based on pseudo noises which are phased shifted by individual phase shifting quantities which are the same as the individual phase shifting quantities of the pseudo noises for modulation.

31. A data transmission apparatus as set forth in claim 30, wherein said modulation means is provided by operational amplifiers, said phase shift means and said convolution means are pipeline registers which are alternatively connected with said operational amplifiers, and said demodulation means includes a register, an operational amplifier for performing predetermined operations based on the content of said register, the received data and a maximal-sequence code to obtain operation results and for supplying the operation results to said register, and an inverter for outputting regeneration data based on the uppermost digit of said register.

32. A data transmission apparatus comprising;
pseudo noise generating means for generating plural pseudo noises for modulation based on a pseudo noise having significant auto-correlation characteristics, the plural pseudo noises for modulation being phase shifted by different individual phase shifting quantities;
modulation means for modulating the plural pseudo noises for modulation based on at least plural data for transmission;
convolution means for convoluting the modulated pseudo noises for modulation to obtain convoluted data which includes data equivalent to a modulated pseudo noise based on predetermined standard data;
demodulation means for demodulating the convoluted data based on pseudo noises which are the same as the pseudo noises for modulation; and
restoration means for restoring data other than the standard data based on the demodulated standard data.

33. A data transmission apparatus as set forth in claim 33, wherein said modulation means is provided by multipliers, said convolution means is an adder, and said demodulation means includes a first register, a shifter for shifting a standard maximal-sequence code with a predetermined phase, a second register for holding the received data, and an operational amplifier for performing predetermined operations based on the content of said first register, the received data, a maximal-sequence code output from said shifter and the received data output from said second register to obtain operation results and for supplying the operation results to said first register.

34. A data transmission apparatus comprising;
modulation means for modulating a plurality of pseudo noises for modulation based on at least plural data for transmission to obtain a corresponding plurality of modulated pseudo noises, the pseudo noises having significant auto-correlation characteristics;
phase shift means for phase shifting each modulated pseudo noise by a different quantity to obtain phase shifted and modulated pseudo noises;
convolution means for convoluting the phase shifted and modulated pseudo noises to obtain convoluted data which includes data equivalent to a modulated pseudo noise based on predetermined standard data;
demodulation means for demodulating the convoluted data based on pseudo noises which are the same as the pseudo noises for modulation and which are phase shifted in the same way; and
restoration means for restoring data other than the standard data based on demodulated standard data.

35. A data transmission apparatus as set forth in claim 34, wherein said modulation means is provided by operational amplifiers, said phase shift means and said convolution means are pipeline registers which are alternatively connected with said operational amplifiers, and said demodulation means includes a first register, a shifter for shifting a standard maximal-sequence code with a predetermined phase, a second register for holding the received data, and an operational amplifier for performing predetermined operations based on the content of said first register, the received data, a maximal-sequence code output from said shifter and the received data output from said second register to obtain operation results and for supplying the operation results to said first register.

36. A data processing apparatus comprising;
receiving means for receiving data signals obtained by modulating plural pseudo noises for modulation having significant auto-correlation characteristics and by phase shifting the plural pseudo noises for modulation by different quantities based on data for transmission associated with each pseudo noise for transmission and by convoluting the modulated and phase shifted pseudo noises;
cross-correlation means for data for obtaining cross-correlation values of the convoluted data signals with previous obtained timed sequence data based on a pseudo noise and weighting factor for the data;
cross-correlation means for standards for obtaining cross-correlation values of the convoluted data with a pseudo noise having a predetermined phase shift quantity; and
processing means for performing predetermined processing based on both cross-correlation values to obtain output data.

37. A data processing apparatus as set forth in claim 36, wherein said cross-correlation means for standards generates a cross-correlation value corresponding to a "0" level, and said cross-correlation means for standards supplies the cross-correlation value as a common value to plural data processing apparatus.

38. A data processing apparatus as set forth in claim 36, wherein said cross-correlation means for standards generates a value which includes a weighting factor to the cross-correlation value.

39. A data processing apparatus as set forth in claim 36, wherein said processing means performs offset correction processing and threshold processing based on the cross-correlation values output from both cross-correlation means.

40. A data processing apparatus comprising;
receiving means for receiving data signals obtained by modulating plural pseudo noises for modulation having significant auto-correlation characteristics and by phase shifting the plural pseudo noises for modulation by different quantities based on data for transmission associated with each pseudo noise for modulation and by convoluting the modulated and phase shifted pseudo noises to provide the data signal;
cross-correlation means for data for obtaining cross-correlation values of the convoluted data signals with previously obtained time sequence data based on weighting factors for the data and on the difference between the pseudo noise and a pseudo noise corresponding to standard data.

41. A neural network comprising;

plural data processing apparatus which are classified as an input layer, intermediate layer and output layer of said neural network;

modulation means for modulating pseudo noises which are phase shifted by different phase shifting quantities based on the output data from all said data processing apparatus of said input layer or from all said data processing apparatus of said intermediate layer to provide output data from the modulation means; and convolution means for convoluting the output data from each modulation means to provide convoluted data and for supplying the convoluted data to said data processing apparatus of the next layer through a common data transmission channel, wherein said data processing apparatus includes receiving means for receiving data as convoluted data, said convoluted data being obtained by modulating plural pseudo noises for modulation having significant auto-correlation characteristics and being phase shifted by different quantities based on plural data for transmission and by convoluting the modulated pseudo noises, cross-correlation means for data for obtaining cross-correlation values for the convoluted data with previously obtained time sequence data based on a pseudo noise and weighting factors for each data, cross-correlation means for standards for obtaining a cross-correlation value for the convoluted data with a pseudo noise having a predetermined phase shift quantity, and processing means for performing predetermined processing based on cross-correlation values from the cross correlation means for data and the cross-correlation means for standards to obtain output data.

42. A neural network as set forth in claim 41, wherein said pseudo noise is a maximal-sequence code which has a code length greater than a number of neuron devices of each layer.

* * * * *